United States Patent
Tanimoto

(10) Patent No.: US 9,319,484 B2
(45) Date of Patent: *Apr. 19, 2016

(54) RELAY COMMUNICATION SYSTEM AND RELAY SERVERS

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 420 days.

This patent is subject to a terminal disclaimer.

(21) Appl. No.: 13/994,187

(22) PCT Filed: Oct. 17, 2011

(86) PCT No.: PCT/JP2011/073874
§ 371 (c)(1),
(2), (4) Date: Jun. 14, 2013

(87) PCT Pub. No.: WO2012/081304
PCT Pub. Date: Jun. 21, 2012

(65) Prior Publication Data
US 2013/0282802 A1 Oct. 24, 2013

(30) Foreign Application Priority Data
Dec. 16, 2010 (JP) .................. 2010-280039

(51) Int. Cl.
*G06F 15/16* (2006.01)
*H04L 29/06* (2006.01)
(Continued)

(52) U.S. Cl.
CPC ............ *H04L 67/42* (2013.01); *H04L 12/4641* (2013.01); *H04L 12/6418* (2013.01); *H04L 12/4675* (2013.01); *H04L 45/04* (2013.01); *H04L 45/22* (2013.01)

(58) Field of Classification Search
CPC ..... H04L 12/4675; H04L 45/04; H04L 45/22; H04L 12/4641
See application file for complete search history.

(56) References Cited

U.S. PATENT DOCUMENTS

| 2008/0288591 A1 | 11/2008 | Tanimoto |
| 2011/0161525 A1 | 6/2011 | Tanimoto |
| 2012/0057602 A1 | 3/2012 | Tanimoto |

FOREIGN PATENT DOCUMENTS

| JP | 2008-129991 A | 6/2008 |
| JP | 2010-068051 A | 3/2010 |
| JP | 2010-268312 A | 11/2010 |

OTHER PUBLICATIONS

English translation of Official Communication issued in corresponding International Application PCT/JP2011/073874, mailed on Jun. 27, 2013.

(Continued)

*Primary Examiner* — Richard G Keehn
*Assistant Examiner* — Mohammed Ahmed
(74) *Attorney, Agent, or Firm* — Keating & Bennett, LLP

(57) ABSTRACT

A virtual network is dynamically created when a relay communication system is constructed including a plurality of relay servers that communicate with each other. In the relay communication system, VLAN client terminals which define a VLAN group share VLAN group information. In addition, a VLAN session is established between the VLAN devices as activatable VLAN client terminals among the VLAN client terminals based on the VLAN group information, and the VLAN devices are allowed to share virtual address information created when the VLAN group is activated. Furthermore, if the VLAN group has already been activated when instructed to activate the VLAN group, a join-in-progress signal to the VLAN group is transmitted to a join-in-progress VLAN client terminal as a transmission source of the activation instruction, and a VLAN session is established that is related to the join-in-progress VLAN client terminal and has not been established yet.

7 Claims, 20 Drawing Sheets

(51) Int. Cl.
*H04L 12/64* (2006.01)
*H04L 12/707* (2013.01)
*H04L 12/715* (2013.01)
*H04L 12/46* (2006.01)

(56) References Cited

OTHER PUBLICATIONS

Official Communication issued in International Patent Application No. PCT/JP2011/073874, mailed on Dec. 13, 2011.

FIG. 4
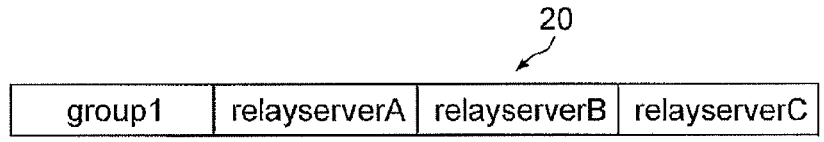
FIG. 5
```
<?xml version="1.0" encoding="UFT-8" standalone="no" ?>
- <root>
  - <group id="1279671471393.clientA1.rd.002@trial.net"
      lastmod="20070402133100" name="group1">       ⎫ 201
      <site id="serverA.rd.002@trial.net" rel="allow" />  ⎫
      <site id="serverB.rd.002@trial.net" rel="allow" />  ⎬ 202
      <site id="serverC.rd.002@trial.net" rel="allow" />  ⎭
    </group>
  </root>
```
FIG. 6
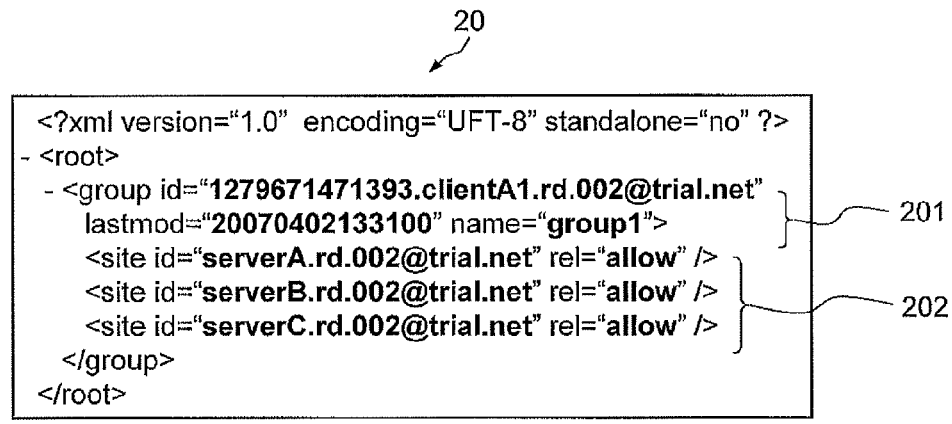

```
<?xml version="1.0" encoding="UFT-8" ?>
- <root>
    - <site id="serverA@trial.net" name="serverA" stat="active">                    }  301-1
        <node div="dev" group="1279671471393.clientA1.rd.002@serverA.trial.net"
            id="clientA1.rd.002@serverA.trial.net" name="clientA1"
            site="serverA@trial.net" />
        <node div="dev" group="1279671471393.clientA1.rd.002@serverA.trial.net"     } 302-1
            id="clientA2.rd.002@serverA.trial.net" name="clientA2"
            site="serverA@trial.net" />
    </site>                                                                          } 301-2
    - <site id="serverB@trial.net" name="serverB" stat="active">
        <node div="dev" group="1279671471393.clientA1.rd.002@serverA.trial.net"
            id="clientB1.rd.002@serverB.trial.net" name="clientB1"
            site="serverB@trial.net" />
        <node div="dev" group="1279671471393.clientA1.rd.002@serverA.trial.net"     } 302-2
            id="clientB2.rd.002@serverB.trial.net" name="clientB2"
            site="serverB@trial.net" />
    </site>                                                                          } 301-3
    - <site id="serverC@trial.net" name="serverC" stat="active">
        <node div="dev" group="1279671471393.clientA1.rd.002@serverA.trial.net"
            id="clientC1.rd.002@serverC.trial.net" name="clientC1"                  } 302-3
            site="serverC@trial.net" />
    </site>
</root>
```

```
<?xml version="1.0" encoding="UFT-8" ?>
- <root>
    <node addr="192.168.2.1" div="dev" expr="1213935978484"
        group="1279671471393.clientA1.rd.002@serverA.trial.net"
        id="clientA2.rd.002@serverA.trial.net" name="clientA2" pass="abc"
        port="50700" />
    <node addr="192.168.1.30" div="dev" expr="1213935978484"
        group="1279671471393.clientA1.rd.002@serverA.trial.net"
        id="clientA1.rd.002@serverA.trial.net" name="clientA1" pass="def" port="0" />
</root>
```

```
<?xml version="1.0" encoding="UFT-8" ?>
- <root>
    <node addr="192.100.1.3" div="dev" expr="1213935978484"
       group="1279671471393.clientA1.rd.002@serverA.trial.net"
       id="clientB1.rd.002@serverB.trial.net" name="clientB1" pass="abc"
       port="50700" />
    <node addr="192.100.1.2" div="dev" expr="1213935978484"
       group="1279671471393.clientA1.rd.002@serverA.trial.net"
       id="clientB2.rd.002@serverB.trial.net" name="clientB2" pass="noui"
       port="50700" />
  </root>
```

FIG. 9

```
<?xml version="1.0" encoding="UFT-8" ?>
- <root>
    <node addr="200.1.2.1" div="dev" expr="1213935978484"
       group="1279671471393.clientA1.rd.002@serverA.trial.net"
       id="clientC1.rd.002@serverC.trial.net" name="clientC1" pass="abc"
       port="50700" />
  </root>
```

FIG. 10

```
<?xml version="1.0" encoding="UFT-8" ?>
<root>
<vnet auto="0" group="1279671471393.clientA1.rd.002@trial.net"
    id="1279672104671.clientA1.rd.002@trial.net" lastmod="1279672104671"
    name="vlangroup1">
<dev id="clientA1.rd.002@serverA.trial.net" />
<dev id="clientB1.rd.002@serverB.trial.net" />
<dev id="clientB2.rd.002@serverB.trial.net" />
<dev id="clientC1.rd.002@serverC.trial.net" />
<ssn sp="serverA.trial.net" ep="serverB@trial.net" />
<ssn sp="serverA.trial.net" ep="serverC@trial.net" />
<ssn sp="serverB.trial.net" ep="serverC@trial.net" />
</vnet>
</root>
```

FIG. 11

| ID | virtual IP address | virtual MAC address |
|---|---|---|
| clientA1.rd.002@trial.net | 117.112.0.1 | 00.11.22.f0.00.01 |
| clientB1.rd.002@trial.net | 117.112.0.2 | 00.11.22.f0.00.02 |
| clientC1.rd.002@trial.net | 117.112.0.3 | 00.11.22.f0.00.03 |

```
<?xml version="1.0" encoding="UFT-8" ?>
- <root>
   - <site id="serverA@trial.net" name="serverA" stat="active">            311-1
      <node div="dev" group="1279671471393.clientA1.rd.002@serverA.trial.net"
         id="clientA1.rd.002@serverA.trial.net" name="clientA1"
         site="serverA@trial.net" />
      <node div="dev" group="1279671471393.clientA1.rd.002@serverA.trial.net"       312-1
         id="clientA2.rd.002@serverA.trial.net" name="clientA2"
         site="serverA@trial.net" />
   </site>
</root>
```
31-1

FIG. 15

```
<?xml version="1.0" encoding="UFT-8" ?>
- <root>
   - <site id="serverB@trial.net" name="serverB" stat="active">            311-2
      <node div="dev" group="1279671471393.clientA1.rd.002@serverA.trial.net"
         id="clientB1.rd.002@serverB.trial.net" name="clientB1"
         site="serverB@trial.net" />
      <node div="dev" group="1279671471393.clientA1.rd.002@serverA.trial.net"       312-2
         id="clientB2.rd.002@serverB.trial.net" name="clientB2"
         site="serverB@trial.net" />
   </site>
</root>
```
31-2

FIG. 16

```
<?xml version="1.0" encoding="UFT-8" ?>
- <root>
   - <site id="serverC@trial.net" name="serverC" stat="active">            311-3
      <node div="dev" group="1279671471393.clientA1.rd.002@serverA.trial.net"
         id="clientC1.rd.002@serverC.trial.net" name="clientC1"                     312-3
         site="serverC@trial.net" />
</site>
</root>
```
31-3

90

| clientB1.rd.002@trial.net | 201.101.35.189 | 01:5e:0c:00:22:28 | } 90-1 |

| clientC1.rd.002@trial.net | 172.168.1.25 | 00:01:0c:07:ac:28 | } 90-2 |

| clientA1.rd.002@trial.net | 200.1.40.165 | 05:81:dc:09:0c:08 |
| clientB1.rd.002@trial.net | 201.101.35.189 | 01:5e:0c:00:22:28 |
| clientC1.rd.002@trial.net | 172.168.1.25 | 00:01:0c:07:ac:28 |

FIG. 22

RELAY COMMUNICATION SYSTEM AND RELAY SERVERS

BACKGROUND OF THE INVENTION

1. Field of the Invention

The present invention relates to a relay communication system including a plurality of relay servers that can communicate with each other, a plurality of client terminals, and LANs connecting the client terminal to the relay server, and further to a relay server used in the relay communication system.

2. Description of the Related Art

In some systems, client terminals connected to remote local area networks (LANs) communicate with each other through a wide area network (WAN). A virtual private network (VPN) makes it possible to configure a virtual network in which the remote local area networks (LANs) are connected directly with each other. However, in the virtual private network (VPN), it is difficult to configure a network that is expandable and flexible.

A relay communication system shown in Japanese Laid-open Patent Publication No. 2008-129991 can configure a virtual network in which the remote local area networks (LANs) are directly connected with each other, as in the virtual private network (VPN). Moreover, in the relay communication system, it is easy to configure a network with expandability and flexibility, unlike the virtual private network (VPN).

In the relay communication system shown in Japanese Laid-open Patent Publication No. 2008-129991, the number and the connection states of LANs and client terminals may be changed. However, in Japanese Laid-open Patent Publication No. 2008-129991, no specific means is disclosed that confirms changes to the number of client terminals in real time and connection states of client terminals when the relay server designates a destination for communication. In Japanese Laid-open Patent Publication No. 2008-129991, no specific means is disclosed to dynamically configure a virtual network between a client terminal and a relay server.

SUMMARY OF THE INVENTION

Preferred embodiments of the present invention dynamically create a virtual network when configuring a relay communication system that includes a plurality of relay servers able to communicate with each other.

Hereinafter, a plurality of preferred embodiments of the present invention which correct problems in the prior art are disclosed. The preferred embodiments can be combined with each other as necessary.

According to one preferred embodiment of the present invention, a relay communication system includes a first network, a second network, a first relay server, a second relay server, and client terminals. The first relay server is connected to the first network. The second relay server is connected to the second network, and is configured to communicate with the first relay server via a third network. One or more client terminals are connected to the first relay server via the first network. Another one or more client terminals are connected to the second relay server via the second network.

Each of the first relay server, the second relay server, the one or more client terminals connected to the first relay server, and the one or more client terminals connected to the second relay server includes a relay group information storage unit, a relay server information storage unit, an information sharing unit, and a VLAN group information control unit.

The relay group information storage unit is configured to store relay group information that indicates the first relay server, the second relay server, the one or more client terminals connected to the first relay server, and the one or more client terminals connected to the second relay server define a relay group. The relay server information storage unit is configured to store relay server information including activation information of the first relay server, activation information of the second relay server, activation/registration information of the one or more client terminals connected to the first relay server, and activation/registration information of the one or more client terminals connected to the second relay server. The information sharing unit is configured to allow the first relay server, the second relay server, the one or more client terminals connected to the first relay server, and the one or more client terminals connected to the second relay server, to share the relay group information and the relay server information. The VLAN group information control unit is programmed and configured to allow VLAN client terminals defining the VLAN group in the relay group to share VLAN group information. At least two client terminals among the one or more client terminals connected to the first relay server and the one or more client terminals connected to the second relay server are the VLAN client terminals. The VLAN group information includes hub information including identification information of the first relay server or identification information of the second relay server to which the VLAN client terminal is connected, and session information that indicates a connecting-side and a connected-side of a session established between the first relay server and the second relay server, and identification information that identifies the VLAN client terminal.

Each of the first relay server and the second relay server further includes a VLAN session control unit, and an activation command control unit. The VLAN session control unit is programmed and configured to, if the VLAN group is not activated in a case of receiving an activation instruction of the VLAN group, establish a hub session as a VLAN session between the first relay server and the second relay server based on the session information, and establish a device session as a VLAN session between a VLAN device as an activatable VLAN client terminal and the first relay server or the second relay server to which the VLAN device is connected. The activation command control unit is programmed and configured to, if the VLAN group is activated in a case of receiving an activation instruction of the VLAN group, transmit a join-in-progress signal which allows a join-in-progress to a VLAN group to a join-in-progress VLAN client terminal as a transmission source of the activation instruction.

Each of the one or more client terminals connected to the first relay server and the one or more client terminals connected to the second relay server further includes a virtual address control unit. The virtual address control unit is programmed and configured to, if the client terminal is the join-in-progress VLAN client terminal and receives the join-in-progress signal, update the virtual address information by adding a virtual address of a client terminal created based on the virtual address information including a virtual address assigned to the VLAN device constituting the VLAN group in an active state, and transmit the updated virtual address information to the VLAN device. The VLAN session control unit is programmed and configured to establish a VLAN session that is related to the join-in-progress VLAN client terminal and has not been established yet. The join-in-progress VLAN client terminal and the VLAN device are configured to communicate with each other, using the updated virtual address information and the established VLAN session including the hub session and the device session.

In this case, the VLAN session control unit further establishes a VLAN session that is related to the join-in-progress VLAN client terminal and has not been established yet. Furthermore, the join-in-progress VLAN client terminal and the VLAN device communicate with each other, using the updated virtual address information and the established VLAN session including the hub session and the device session.

In this case, even if the VLAN group is in an active state when receiving the activation instruction of the VLAN group, the VLAN client terminal is arranged to join in-progress with the VLAN group in the active state. Accordingly, overlapped activation of the VLAN group is prevented.

The activation command control unit is preferably configured to determine whether or not the virtual address is assigned to the VLAN device of the VLAN group in the active state, and transmit the join-in-progress signal to the join-in-progress VLAN client terminal if the virtual address is assigned.

The virtual address control unit is preferably configured to determine whether or not virtual address for a client terminal can be created referring to the virtual address information, and finish a process of join-in progress to the VLAN group if it is determined that the virtual address cannot be created.

The virtual address preferably includes a virtual IP address and a virtual MAC address.

According to another preferred embodiment of the present invention, a relay server is configured to serve as a second relay server connected to a second network, and communicate with a first relay server connected to a first network. The relay server includes a relay group information storage unit, a relay server information storage unit, an information sharing unit, a VLAN group information control unit, a VLAN session control unit, an activation command control unit, and a relay server communication control unit. The relay group information storage unit is configured to store relay group information that indicates that the first relay server, the second relay server, one or more client terminals connected to the first relay server, and one or more client terminals connected to the second relay server define a relay group. The relay server information storage unit is configured to store relay server information including activation information of the first relay server, activation information of the second relay server, activation/registration information of the one or more client terminals connected to the first relay server, and activation/registration information of the one or more client terminals connected to the second relay server. The information sharing unit is configured to allow the first relay server, the second relay server, the one or more client terminals connected to the first relay server, and the one or more client terminals connected to the second relay server, to share the relay group information and the relay server information. The VLAN group information control unit is programmed and configured to allow VLAN client terminals defining the VLAN group in the relay group to share VLAN group information. At least two client terminals among the one or more client terminals connected to the first relay server and the one or more client terminals connected to the second relay server are the VLAN client terminals. The VLAN group information including hub information includes identification information of the first relay server and identification of the second relay server to which the VLAN client terminal is connected, and session information that indicates a connecting-side and a connected-side of a session established between the first relay server and the second relay server, and identification information that identifies the VLAN client terminal. The VLAN session control unit is programmed and configured to, if the VLAN group is not in an active state in a case of receiving activation instruction of the VLAN group, establish a hub session as a VLAN session with the first relay server based on the session information, and establish a device session as a VLAN session with a VLAN device as an activatable VLAN client terminal among the VLAN client terminals connected to the second relay server. The activation command control unit is programmed and configured to, if the VLAN group is in an active state in a case of receiving activation instruction related to the VLAN group, transmit a join-in progress signal to permit join-in-progress to the VLAN group to a join-in-progress VLAN client terminal as a transmission source of the activation instruction. The relay server communication control unit is programmed and configured to control communication of the VLAN group. The VLAN session control unit is programmed and configured to, in response to the join-in-progress signal, if receiving the virtual address information updated by adding a virtual address of the join-in-progress VLAN client terminal to a virtual address assigned to the VLAN device constituting the activated VLAN group, establish a VLAN session that is related to the join-in-progress VLAN client terminal and has not been established yet. The relay server communication control unit is programmed and configured to control communication between the join-in-progress VLAN client terminal and the VLAN device, the communication being performed using the updated virtual address information and the established VLAN session including the hub session and the device session.

The activation command control unit is programmed and configured to determine whether or not a virtual address has been assigned to the VLAN device of the activated VLAN group, and transmit the join-in-progress signal to the join-in-progress VLAN client terminal if the virtual address is assigned.

The virtual address includes a virtual IP address and a virtual MAC address.

According to preferred embodiments of the present invention, a virtual network can be dynamically created when constructing a relay communication system including a plurality of relay servers that can communicate with each other.

Furthermore, when transmitting the activation instruction of the VLAN group, even if the VLAN group is in an active state, the VLAN client terminal is arranged to join in-progress with the VLAN group in active state. Accordingly, the overlapped activation of the VLAN group is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a view showing a schematic configuration of relay group information according to a preferred embodiment of the present invention.

FIG. 5 is a view showing a detailed configuration of relay group information according to a preferred embodiment of the present invention.

FIG. 6 is a view showing a schematic configuration of relay server information according to a preferred embodiment of the present invention.

FIG. 7 is a view showing a detailed configuration of relay server information according to a preferred embodiment of the present invention.

FIG. 8 is a view showing a schematic configuration of client terminal information stored in a first relay server according to a preferred embodiment of the present invention.

FIG. 9 is a view showing a schematic configuration of client terminal information stored in a second relay server according to a preferred embodiment of the present invention.

FIG. 10 is a view showing a schematic configuration of client terminal information stored in a third relay server according to a preferred embodiment of the present invention.

FIG. 11 is a view showing a detailed configuration of VLAN group information according to a preferred embodiment of the present invention.

FIG. 12 is a view showing a detailed configuration of virtual address information according to a preferred embodiment of the present invention.

FIG. 14 is a view showing the detailed configuration of relay server information before the exchange according to a preferred embodiment of the present invention.

FIG. 15 is a view showing the detailed configuration of the relay server information before the exchange according to a preferred embodiment of the present invention.

FIG. 16 is a view showing the detailed configuration of the relay server information before the exchange according to a preferred embodiment of the present invention.

FIG. 21 is a view showing an example of the first extraction information related to IP address and MAC address of the VLAN device according to a preferred embodiment of the present invention.

FIG. 22 is a view showing an example of the second extraction information produced by adding IP address and MAC address of the first client terminal to the first extraction information according to a preferred embodiment of the present invention.

DETAILED DESCRIPTION OF THE PREFERRED EMBODIMENTS

In a relay communication system according to a preferred embodiment of the present invention, client terminals can communicate with each other through a wide area network (WAN), through a plurality of relay servers realizing a function similar to hubs.

Figure 1:
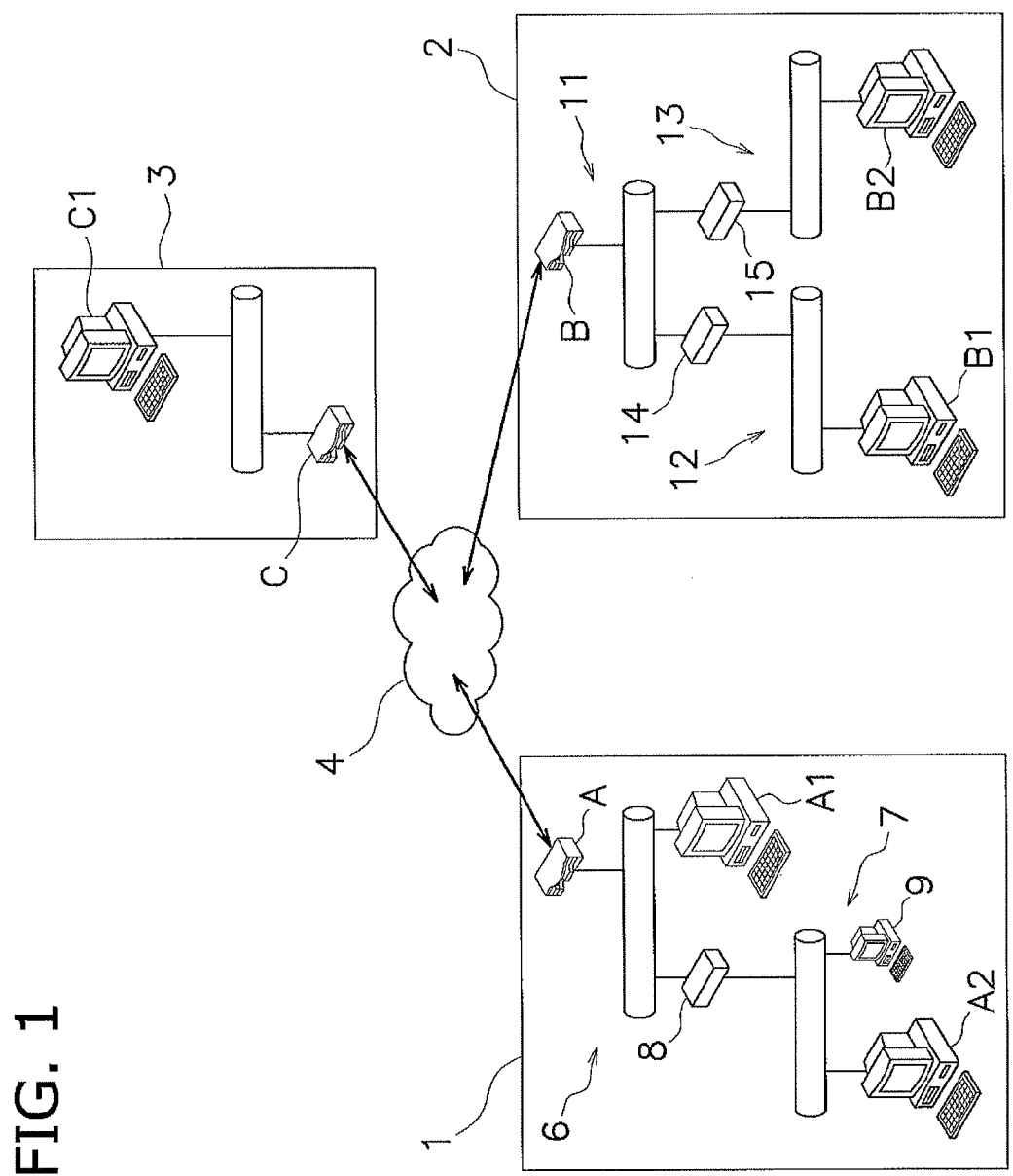
FIG. 1 is a schematic diagram the overall configuration of a relay communication system according to a preferred embodiment of the present invention.

Hereinafter, referring to drawings, preferred embodiments of the present invention will be explained. FIG. 1 shows an overall structure of the relay communication system according to a preferred embodiment of the present invention. The relay communication system preferably includes a first LAN 1, a second LAN 2, a third LAN, a wide area network (WAN) 4. The first LAN 1, the second LAN 2 and the third LAN 3 are a small-sized network remotely provided. The wide area network (WAN) 4 is a large-scale network such as Internet.

In this preferred embodiment, explained in detail later, a first relay server A of the first LAN 1, a second relay server B of the second LAN 2, a third relay server C of the third LAN 3 define a first relay group as a relay server group.

The first LAN 1 preferably includes a fourth LAN 6 and a fifth LAN 7, and the fourth LAN 6 and the fifth LAN 7 are preferably connected with each other via a first general purpose router 8. In the fourth LAN 6, a first relay server A and a first client terminal A1 are preferably connected with each other. In the fifth LAN 7, a second client terminal A2 and second communication equipment 9 are preferably connected with each other.

The second LAN 2 includes a sixth LAN 11, a seventh LAN 12, and an eighth LAN 13. The sixth LAN 11 and the seventh LAN 12 are connected with each other via a second general purpose router 14, and the sixth LAN 11 and the eighth LAN 13 are connected with each other through a third general purpose router 15. The second relay server B belongs to the sixth LAN 11. The third client terminal B1 is connected to the seventh LAN 12. A fourth client terminal B2 is connected to the eighth LAN 13.

In the third LAN 3, the third relay server C and the fifth client terminal C1 are connected with each other.

The first client terminal A1, the second client terminal A2, the third client terminal B1, the fourth client terminal B2, and the fifth client terminal C1 are preferably personal computers, for example. The second communication equipment 9 is also preferably a personal computer, for example.

The first relay server A, the second relay server B and the third relay server C relays communication among the first client terminal A1, the second client terminal A2, the third client terminal B1, the fourth client terminal B2, and the fifth client terminal C1. A communication protocol among the first relay server A, the second relay server B, and the third relay server C is not particularly limited.

The relay server is connected to the wide area network (WAN) as well as the LAN, so that the relay sever can communicate with relay servers located in other LANs as well as with client terminals connected to the same LAN. Accordingly, each of the relay servers is given a global IP address as well as a private IP address.

Figure 2:
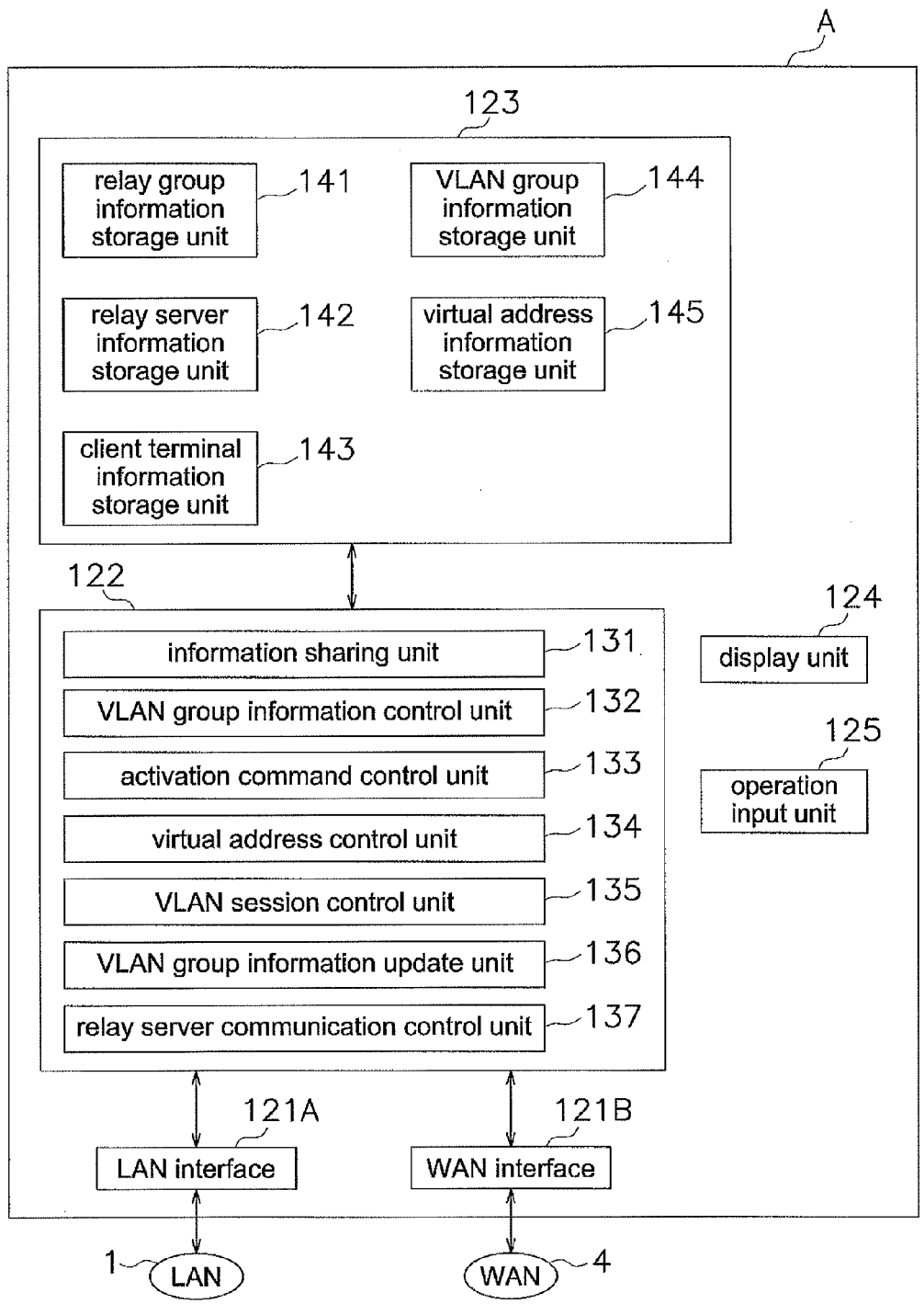
FIG. 2 is a block diagram showing a configuration of a first relay server according to a preferred embodiment of the present invention.

FIG. 2 shows constituent elements of the first relay server A according to a preferred embodiment of the present invention.

The first relay server A preferably includes a LAN interface 121A, a WAN interface 121B, a control unit 122, a database storage unit 123, a display unit 124, and an operation input unit 125.

The LAN interface 121A executes communication with a terminal in the first LAN 1 using the private IP address. The WAN interface 121B executes communication with the wide area network (WAN) 4 using the global IP address.

The control unit 122 is preferably a CPU having functions of the control and operation, for example, and can execute various processes according to loaded programs. The control unit 122 in this preferred embodiment preferably includes an information sharing unit 131, a VLAN group information control unit 132, an activation command control unit 133, a virtual address control unit 134, a VLAN session control unit 135, a VLAN group information update unit 136, and a relay server communication control unit 137.

The information sharing unit 131 creates and updates relay group information, relay server information, and client terminal information, which will be later described. Moreover, the information sharing unit 131 shares the created and updated relay group information with a relay server in the relay group and client terminals connected to the relay server, and stores it in a relay group information storage unit 141 (described later). The information sharing unit 131 shares the created and updated relay server information with a relay server in the relay group and client terminals connected to the relay server, and stores it in a relay server information storage unit 142 (described later). The information sharing unit 131 shares the created and updated client terminal information with relay servers and client terminals in the relay group, and stores it in a client terminal information storage unit 143 (described later).

The VLAN group information control unit 132 shares a VLAN group information (described later) with a VLAN client terminal in the relay group and a relay server connected to the VLAN client terminal, and stores it in a VLAN group information storage unit 144 (described later). The VLAN client terminal is a client terminal that constitutes a VLAN group in the relay group.

The activation command control unit 133 is programmed and arranged to determine whether or not the VLAN group that is the same as the received VLAN group has been already activated, when receiving the activation information of the VLAN group from the client terminal, which has received the activation instruction of the VLAN group from a user. The activation information preferably includes activation command of the VLAN group, activation time, and VLAN group information. Here, if the VLAN group has already been activated, the activation command control unit 133 transmits a join-in-progress signal to a client terminal as a transmission source of the activation instruction, and executes a process of permitting the client terminal to join in-progress with the VLAN group. The join-in-progress signal is a signal permitting to join in-progress with the VLAN group, and is transmitted together with later-described virtual address information.

Specifically, if the same VLAN group has already been activated, the activation command control unit 133 refers to the activation time of the activation information which has activated in advance the VLAN group and the activation time of the received activation information, and determines that the activation time having earlier activation time is valid.

After that, the activation command control unit 133 determines whether or not the client terminal which is a transmission source of the invalid activation information has already received the initialization command and the virtual address information related to the valid activation information including the earlier activation time. Then, if the initialization command and the virtual address information have been already received, the activation command control unit 133 transmits the above-described join-in-progress signal to the client terminal as a transmission source of the invalid activation information. Here, the activation command control unit 133 finishes the process of joining in-progress the VLAN group if the initialization command and the virtual address information related to the valid activation information has not been received.

On the other hand, if it is determined that the received activation information is valid, the activation command control unit 133 executes the process of activating the VLAN group. The activation command control unit 133 first extracts a VLAN client terminal connected to the first relay server A, from the VLAN group information. Then, the activation command control unit 133 determines whether or not the extracted VLAN client terminal is activatable or not. The phrase "activatable VLAN client terminal" refers to a client terminal that is currently logging in and is not currently joining other VLAN groups. The activation command control unit 133 refers to relay server information stored in the relay server information storage unit 142, and determines whether or not the extracted VLAN client terminal is logging in. Furthermore, the activation command control unit 133 determines whether or not the extracted VLAN client terminal is activatable by sending a later-described activation command, the detail of which will be described later. Below, the VLAN client terminal which is determined as activatable by the activation command control unit 133 is called a VLAN device. If it is determined that the VLAN device exists, the activation command control unit 133 transmits a response signal including the IP address and the MAC address of the VLAN device to a client terminal as a transmission source of the valid activation information of the VLAN group. The detail of the VLAN group information will be described later.

When virtual address control unit 134 receives the virtual address information and an initialization command, it transmits the virtual address information and the initialization command to the VLAN device connected to the first relay server A. In addition, the virtual address control unit 134 stores the virtual address information into the virtual address information storage unit 145 (described later). The detail of the virtual address information will be described later. The initialization command is a command related to initialization of the VLAN interface 221B.

The VLAN session control unit 135 refers to the VLAN group information, and establishes a hub session as a VLAN session with another relay server to which the VLAN device is connected. In addition, the VLAN session control unit 135 refers to the VLAN group information, and establishes a device session as a VLAN session with a VLAN device connected to the first relay server A. The hub session is a session among the relay servers to which the VLAN device is connected. The device session is a session between the VLAN device and the relay server to which the VLAN device is connected.

Furthermore, the VLAN session control unit 135 establishes a VLAN session related to the client terminal as a transmission source of the join-in-progress command, when receiving the later-described join-in-progress command if the client terminal as a transmission source of the join-in-progress command is connected to the first relay server A.

If the VLAN group information is changed, the VLAN group information update unit 136 allows the VLAN client terminal and the relay servers to which the client terminal is connected to share the updated VLAN group information.

The relay server communication control unit 137 is a processing unit that controls various communications via the LAN interface 121A and the WAN interface 121B, and controls various communication processes in accordance with a protocol such as, for example, TCP/IP, UDP, and SIP.

Furthermore, the relay server communication control unit 137 preferably controls communication between the VLAN devices using the virtual address information and the VLAN session. Specifically, the relay server communication control unit 137 analyzes a communication packet received via LAN interface 121A from the client terminal connected to the first relay server A. Then, if the communication packet includes the virtual address, the relay serer communication control unit 137 refers to the virtual address, and transmits the communication packet via the hub session to the other relay servers. If the relay server communication control unit 137 receives the communication packet via the WAN interface 121B from the other relay server, the relay server communication control unit 137 analyzes the received communication packet. Then, if the communication packet includes the virtual address, the relay server communication control unit 137 transmits the communication packet via the device session to a VLAN interface (described later), to which the virtual address is assigned, of the client terminal under the control of the first client terminal. On the other hand, if the virtual address is not included, the relay server communication control unit 137 transmits the communication packet to the LAN interface (described later) of the client terminal under the control of the first relay server A.

The database storage unit 123 is preferably a hard disk drive or a non-volatile RAM, for example, and can store various data therein. The database storage unit 123 preferably includes a relay group information storage unit 141, a relay server information storage unit 142, a client terminal information storage unit 143, a VLAN group information storage unit 144, and a virtual address information storage unit 145. The detail of the information to be stored in the relay group information storage unit 141, the relay server information storage unit 142, the client terminal information storage unit 143, the VLAN group information storage unit 144, and the virtual address information storage unit 145 will be described later. The constituent elements of the second relay server B and the third relay server C are preferably the same as those of the first relay server A, and their explanation will be omitted.

The client terminal is preferably a terminal the user can directly operate. For example, the client terminal is preferably a personal computer used for day-to-day operations by the user. Each of the client terminals is given a private IP address uniquely managed in the same LAN.

Figure 3:
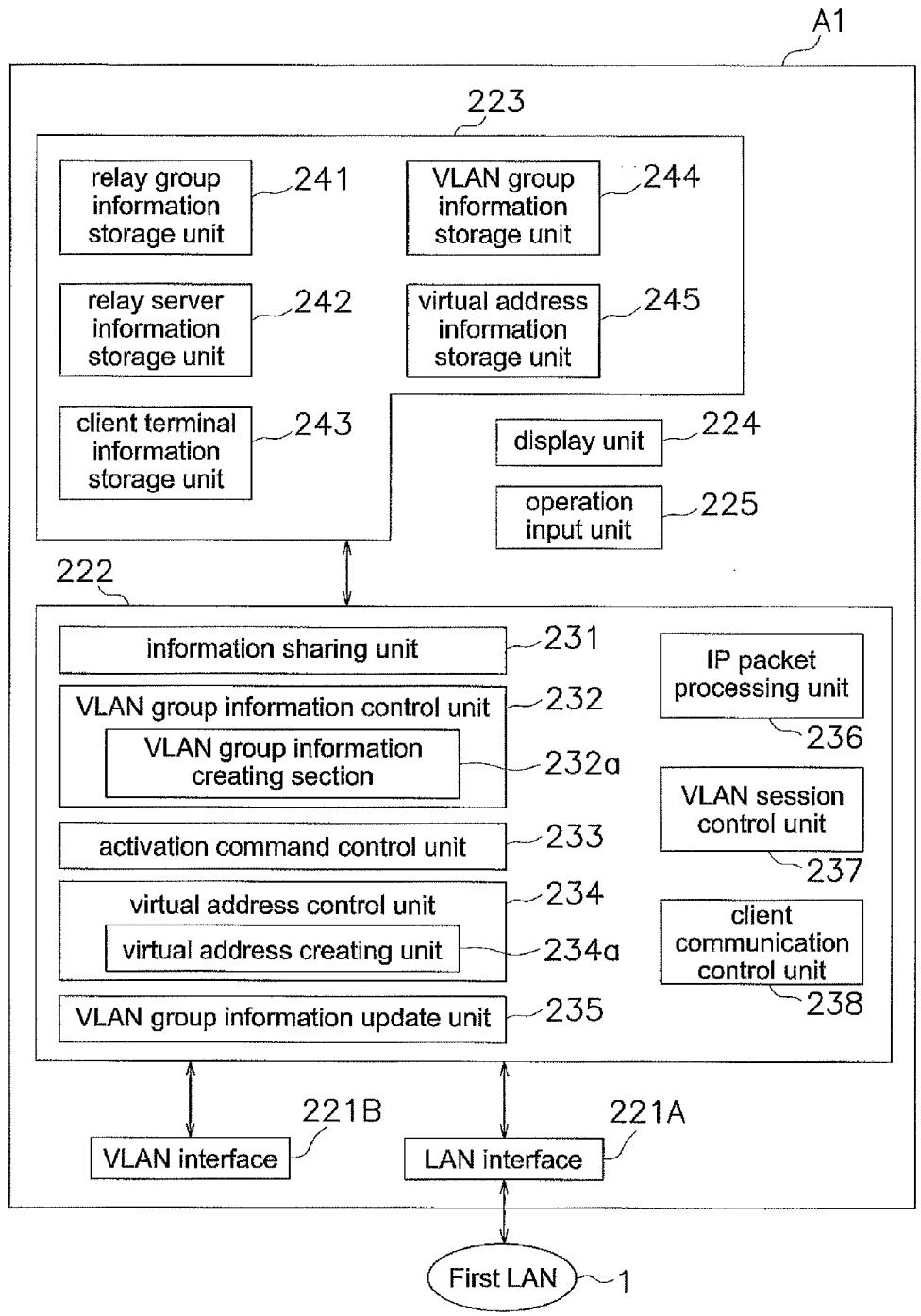
FIG. 3 is a block diagram showing a configuration of a first client terminal according to a preferred embodiment of the present invention.

FIG. 3 shows elements of the first client terminal A1. The first client terminal A1 preferably includes a LAN interface 221A, a VLAN interface 221B, a control unit 222, a database storage unit 223, a display unit 224, and an operation input unit 225.

The LAN interface 221A is arranged to execute communication with the first relay server A and other terminals in the first LAN 1 using the private IP address.

The VLAN interface 221B is arranged to execute communication with other terminal in the first relay group via the first relay server A using the virtual IP address (described later) and the device session.

The control unit 222 is a CPU that includes control and operation functions, and is arranged to execute various processes according to the loaded program. The control unit 222 in this preferred embodiment preferably includes an information sharing unit 231, a VLAN group information control unit 232, an activation command control unit 233, a virtual address control unit 234, a VLAN group information update unit 235, an IP packet processing unit 236, a VLAN session control unit 237, and a client communication control unit 238.

The information sharing unit 231 shares the relay group information with the relay server in the relay group and client terminals connected to the relay server, and stores them in the relay group information storage unit 241 (described later). In addition, the information sharing unit 231 shares the relay server information with the relay server in the relay group and client terminals connected to the relay server, and stores it in the relay server information storage unit 242 (described later). In addition, the information sharing unit 131 shares the client terminal information with the relay server and the client terminals in the relay group, and stores it in the client terminal information storage unit 243 (described later).

The VLAN group information control unit 232 shares the VLAN group information between the VLAN client terminal in the relay group and the relay server connected to the VLAN client terminal, and stores it in the VLAN group information storage unit 244 (described later). In addition, the VLAN group information control unit 232 preferably includes a VLAN group information creating section 232a that creates the VLAN group information, and transmits the created VLAN group information to the VLAN client terminal.

The activation command control unit 233 executes an activation process of the VLAN group. Specifically, when the activation command control unit 233 receives the selection for the VLAN group to be activated from the user, it transmits an activation command to an activated relay server among the relay servers connected to the VLAN client terminal. The activation command is a command for providing notification of activation of the VLAN group, and is transmitted together with activation time and VLAN group information of the VLAN group. The activation command control unit 233 refers to the relay server information stored in the relay server information storage unit 242, and determines whether or not the extracted relay server is activatable.

When the activation command control unit 233 receives the response signal in response to the activation command from the relay server, it extracts the IP address and the MAC address of the VLAN device from the response signal.

The virtual address control unit 234 preferably includes a virtual address creating unit 234a that creates virtual address information when receiving a response signal including the IP address and the MAC address of the VLAN device. The virtual address control unit 234 is programmed and arranged to transmit the created virtual address information to the relay server to which the first client terminal A1 is connected. Furthermore, the virtual address control unit 234 is programmed and arranged to store, when receiving the virtual address information and the initialization command, the received virtual address information in the virtual address information storage unit 245.

Furthermore, the virtual address control unit 234 refers to the virtual address information, when receiving the virtual address information and the join-in-progress signal, and determines whether or not it can determine the virtual address for the first client terminal A1. If it is determined that virtual address can be determined, the virtual address control unit 234 determines the virtual address for the first client terminal A1, and updates virtual address information by adding the virtual address information of the first client terminal A1. After that, the virtual address control unit 234 transmits the updated virtual address information and join-in-progress command to the relay server to which the first client terminal A1 is connected. On the other hand, the virtual address control unit 234 finishes the process of joining in-progress the VLAN group if it is determined that the virtual address for the first client terminal A1 cannot be determined.

When the VLAN group information is changed, the VLAN group information update unit 235 shares the updated VLAN group information with a VLAN client terminal and a relay server to which the VLAN client terminal is connected.

The IP packet processing unit 236 outputs the communication packet received from the LAN interface 221A to the client communication control unit 238. In addition, the IP packet processing unit 236 outputs the communication packet to the VLAN session control unit 237 when it receives the commutation packet including the virtual address via the VLAN interface 221B.

The VLAN session control unit 237 processes the communication packet including the virtual address, and allows the device session to function as a VLAN session. When the VLAN session control unit 237 is to transmit the communication packet including the virtual address using the VLAN session, it transmits the communication packet via the VLAN interface 221B.

The client communication control unit 238 processes the communication packet other than the VLAN session, and controls various communication in accordance with a protocol such as TCP/IP, UDP, and SIP via the LAN interface 221A.

The database storage unit 223 preferably is a hard disk drive or a non-volatile RAM, for example, and can store various data. The database storage unit 223 preferably includes a relay group information storage unit 241, a relay server information storage unit 242, a client terminal information storage unit 243, a VLAN group information storage unit 244, and a virtual address information storage unit 245. The detail of information to be stored in the relay group information storage unit 241, the relay server information storage unit 242, the client terminal information storage unit 243, the VLAN group information storage unit 244, and the virtual address information storage unit 245 will be described later.

It should be noted that since the second client terminal A2, the third client terminal B1, the fourth client terminal B2, and the fifth client terminal C1 are preferably similar to the first client terminal A1, the explanation thereof will be omitted.

FIG. 4 shows a schematic configuration of the relay group information 20 according to a preferred embodiment of the present invention. The relay group information 20 is preferably information indicating a summary of the relay groups in the relay communication system, and is stored in the relay group information storage unit 141 of the relay server and the relay group information storage unit 241 of the client terminal. FIG. 4 shows that the first relay group preferably includes the first relay server A, the second relay server B, and the third relay server C.

FIG. 5 shows a detailed configuration of the relay group information 20. The relay group information 20 preferably includes upper information 201 and lower information 202.

The upper information 201 is information on the first relay group itself. "group id" indicates identification information of the relay group. "lastmod" indicates the latest update time of the relay group information. "name" indicates the name of the relay group.

The lower information 202 is information on the first relay server A, the second relay server B, and the third relay server C. "site id" indicates identification information of each relay server.

The relay group information 20 is shared among the first relay server A, the second relay server B, and the third relay server C, and is stored in the relay group information storage unit 141 of the relay servers. In addition, the relay group information 20 is shared between the relay server and the client terminal, and is stored in the relay group information storage unit 241 of the client terminals.

FIG. 6 shows a schematic configuration of the relay server information 30 in accordance with a preferred embodiment of the present invention. The relay server information 30 is information showing a summary of the relay servers and the client terminals defining the relay communication system, and is stored in the relay server information storage unit 142 of the relay servers and the relay server information storage unit 242 of the client terminals.

As shown in FIG. 6, the first client terminal A1 and the second client terminal A2 are connected to the first relay server A. The third client terminal B1 and the fourth client terminal B2 are connected to the second relay server B. The fifth client terminal C1 is connected to the third relay server C.

FIG. 7 shows a detailed configuration of the relay server information 30. The relay server information 30 preferably includes upper information 301-1, 301-2, 301-3, and lower information 302-1, 302-2, 302-3.

The upper information 301-1, 301-2, 301-3 is information on the relay servers. "site id" indicates identification information of the relay server. "name" indicates name of the relay server. "stat" indicates information on whether or not the relay server is activated.

The lower information 302-1, 302-2, 302-3 is information on the client terminal. "div" indicates name of division of the client terminal. "group" indicates identification information of the relay server to which the client terminal belongs. "id" indicates identification information of the client terminal. "name" indicates name of the client terminal. "site" indicates identification information of the relay server to which the client terminal logs in when the client terminal logs in.

The relay server information 30 is preferably shared among the first relay server A, the second relay server B, and the third relay server C, and is stored in the relay server information storage unit 142 of the relay servers. In addition, the relay server information 30 is shared among the relay servers and the client terminals, and is stored in the relay server information storage unit 242 of the client terminals.

When the relay server is being activated, "stat" of the upper information 301-1, 301-2, 301-3 is "active". When the relay server is not being activated, "stat" is blank. Accordingly, the information on whether or not the relay server is being activated is shared in the whole relay communication system.

When the client terminal is logging onto the relay server, identification information of the relay server into which the client terminal logs onto is shown in "site" of the lower information 302-1, 302-2, 302-3. When the client terminal is not logging onto the relay server, "site" is blank. Accordingly, information on whether or not the client terminal is logging onto the relay server is shared in the whole relay communication system.

FIG. 8, FIG. 9, and FIG. 10 respectively show client terminal information 40, 50, 60 as specific examples of the client terminal information in accordance with a preferred embodiment of the present invention. The client terminal information includes information on details of the client terminal defining the relay communication system, and is stored in the client terminal information storage unit 143 of the relay servers and the client terminal information storage unit 243 of the client terminals.

"addr" is address information of the client terminal, and indicates IP address of the client terminal, specifically. "div" indicates name of division of the client terminal. "expr" is expiration period information of the client terminal, and indicates registration expiration period of the client terminal, specifically. "group" indicates identification information of the relay group to which the client terminal belongs. "id" indicates identification information of the client terminal. "name" indicates name of the client terminal. "pass" indicates password of the client terminal. "port" is client terminal port information, and indicates port number of the client terminal, specifically.

The client terminal information 40, 50, and 60 are shared with the relay servers and the client terminals in the relay group, and are stored in the client terminal information storage unit 143 of the relay servers and in the client terminal information storage unit 243 of the client terminals.

VLAN group information is information including information of VLAN client terminals defining the VLAN group, information of the relay servers to which the VLAN client terminals are connected, and the session information among the relay servers.

FIG. 11 shows a detailed configuration of the VLAN group information 70 in accordance with a preferred embodiment of the present invention. The VLAN group information 70 preferably includes group information 71, VLAN client terminal information 72, and session information 73.

The group information 71 is information about the VLAN group. In the group information 71, "group" is identification information of the relay group constituting the VLAN group. "id" indicates identification information of the VLAN group. "lastmod" indicates latest update time of the VLAN group information. "name" indicates name of the VLAN group.

The VLAN client terminal information 72 is information related to VLAN client terminals defining the VLAN group. "dev id" indicates identification information of the VLAN client terminals. In this example, the first client terminal A1, the third client terminal B1, the fourth client terminal B2, and the fifth client terminal C1 are the VLAN client terminals.

The session information 73 includes hub information and routing information. The hub information is identification information of the relay server to which the VLAN client terminal is connected. The routing information is information that defines communication paths among the relay servers, and includes "sp" and "ep". "sp" is a start point of the connection path, and a relay server indicated by the "sp" is on a connecting-side of the relay server. "ep" is an end point of the connection path, and a relay server indicated by the "ep" is on a connected-side of the connection path.

In this example, the hub information includes identification information of the first relay server A, the second relay server B, and the third relay server C. As the routing information, a session is defined in which the start point is the first relay server A and the end point is the second relay server B. In addition, a session is defined in which the start point is the first relay server A and the end point is the third relay server C, and a session is defined in which the start point is the second relay server B and the end point is the third relay server C. Accordingly, in the session information 73, since the start point and the endpoint of the communication path among the relay servers are defined, the communication paths among the relay servers are prevented from overlapping each other.

The VLAN group information 70 is preferably shared between and VLAN client terminals and the relay servers to which the VLAN client terminal is connected, and is stored in the VLAN group information storage unit 244 of the VLAN client terminals and the VLAN group information storage unit 144 of the relay servers. On the other hand, the VLAN group information 70 may be shared only among the VLAN client terminals.

In this preferred embodiment below, an example will be described in which the VLAN group information 70 is shared among the VLAN client terminals, and is stored in the VLAN group information storage unit 244 of the VLAN client terminals. The processes of creating and sharing the VLAN group information 70 will be described later in detail.

The virtual address information is preferably information including identification information of the VLAN device that is activatable as a client terminal of the VLAN group, and a virtual IP address and a virtual MAC address. The virtual address information is stored in the virtual address information storage unit 245 of the VLAN device. In addition, the virtual address information may be stored in the virtual address information storage unit 145 of the relay server.

FIG. 12 shows a detailed configuration of the virtual address information 80 in accordance with a preferred embodiment of the present invention. The virtual address information 80 is associated with the identification information, the virtual IP address, and the virtual MAC address of the VLAN device. The virtual IP address and the virtual MAC address are preferably given such that they do not overlap the IP address and MAC address the VLAN devices actually use. In addition, the virtual IP address and virtual MAC address are given such that they do not overlap each other in the VLAN group.

In the virtual address information 80 of this example, the identification information, the virtual IP address and the virtual MAC address are associated with the first client terminal A1, the third client terminal B1, the fourth client terminal B2, and the fifth client terminal C1, as the VLAN devices.

As described later, since the virtual address information 80 is shared among the VLAN devices, the client terminal belonging to different LANs can communicate with each other as the VLAN devices. The processes of creating and sharing the virtual address information 80 will be described later in detail.

Figure 13:
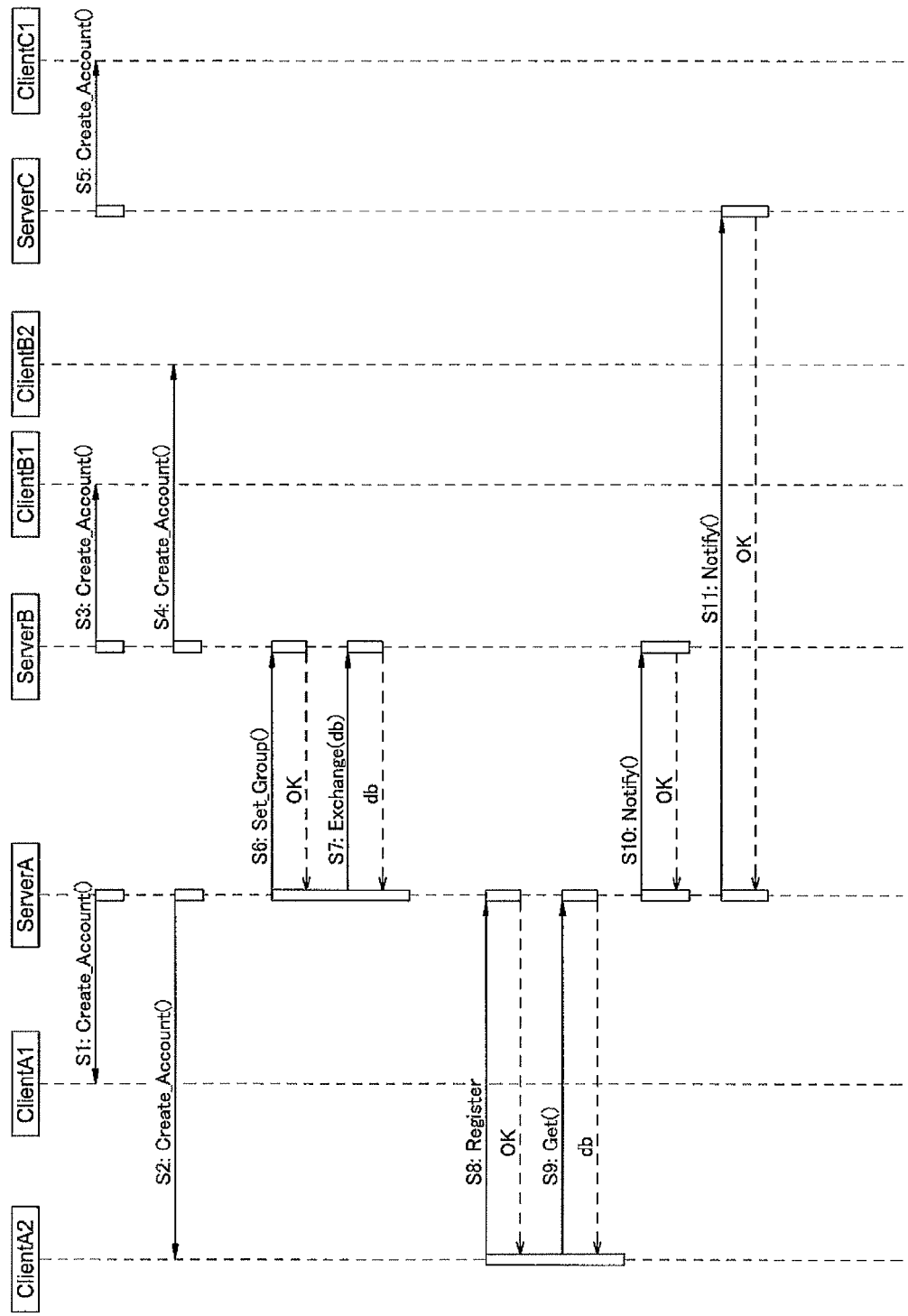
FIG. 13 is a view showing a process flow related to a construction of a relay group according to a preferred embodiment of the present invention.

Using a sequence diagram of FIG. 13, the initialization of the first relay group will be described. Specifically, FIG. 13 shows a flow of processes creating the relay group information, the relay server information, and the client terminal information in accordance with a preferred embodiment of the present invention.

The administrator of the first relay server A creates accounts for users of the first client terminal A1 and the second client terminal A2 (step S1, step S2: Create_Account ( )). The administrator of the second relay server B creates accounts for users of the third client terminal B1 and the fourth client terminal B2 (step S3, step S4: Create_Account ( )). The administrator of the third relay server C creates an account for a user of the fifth client terminal C1 (step S5: Create_Account ( )).

In the above-described processes, the first relay server A creates and stores the relay server information therein. The second relay server B creates and stores the relay server information therein. The third relay server C creates and stores the relay server information therein. The first relay server A creates and stores the client terminal information therein, the second relay server B creates and stores the client terminal information therein, and the third relay server C creates and stores the client terminal information therein.

FIG. 14, FIG. 15, and FIG. 16 respectively shows relay server information 31-1, relay server information 31-2, and relay server information 31-3 in accordance with a preferred embodiment of the present invention. The relay server information 31-1 is preferably information that the first relay server A creates and stores. The relay server information 31-2 is preferably information that the second relay server B creates and stores. The relay server information 31-3 is preferably information the third relay server C creates and stores.

FIG. 14 shows relay server information 31-1. The upper information 311-1 is preferably information related to the first relay server A. As "site id", "serverA@trial.net" is set. As "name", "Server A" is set. As "stat", "active" is set.

The lower information 312-1 is information related to the first client terminal A1 and the second client terminal A2.

The information related to the first client terminal A1 will be described as follows. As "div", "dev" is set. As "group", "1279671471393.clientA1.rd.002@trial.net" is set. As "id, "clientA1.rd.002@ServerA.trial.net" is set. As "name", "clientA1" is set. It should be noted that although "serverA.trial.net" is set as "site" in FIG. 14, meaning that a user of the first client terminal A1 is logging onto the first relay server A, "site" is, in fact, blank in steps S1 to S5 in FIG. 13

The information related to the second client terminal A2 will be described as follows. As "div", "dev" is set. As "group" "1279671471393.clientA1.rd.002@trial.net" is set. As "id", "clientA2.rd.002@ serverA.trial.net" is set. As "name", "clientA2" is set. It should be noted that denotation of the "site" is similar to a case of the first client terminal A1.

The contents of the relay server information 31-2 and the relay server information 31-3, including upper information 311-2, upper information 311-3, lower information 312-2, and lower information 312-3, are preferably similar to the content of the relay server information 31-1, so the explanation thereof will be omitted.

The flow of processes related to creating the relay group information, the relay server information, and the client terminal information will be described, with reference again to FIG. 13. In FIG. 13, the first relay server A requests the second relay server B to send the construction group of the relay communication system (step S6: Set_Group ( )). The first relay server A and the second relay server B create the relay group information and store it therein. Next, the first relay server A requests the second relay server B to exchange the relay server information (step S7: Exchange (db)). Accordingly, the first relay server A transmits the relay server information to the second relay server, and the second relay server B transmits the relay server information to the first relay server A. The first relay server A and the second relay server B synthesize the relay server information to make new relay server information, and then store it therein. It should be noted that the processes similar to step S6 and step S7 are executed between the first relay server A and the third relay server C, and are executed between the second relay server B and the third relay server C. As a result, the common relay server information is shared among the first relay server A, the second relay server B, and the third relay server C.

A user of the second client terminal A2 inputs identification information of the second client terminal A2 and the password for logging onto the first relay server A (step S8: Register). The first relay server A refers to the client terminal information, and then authenticates the user of the second client terminal A2. The first relay server A updates the client terminal information.

Then, the second client terminal A2 requests the first relay server A to transmit the relay group information and the relay server information (step S9: Get ( )). The first relay server A transmits the relay group information and the relay server information to the second client terminal A2. The second client terminal A2 stores the relay group information and the relay server information therein.

The first relay server A refers to the relay server information, and determines that it should notify the second relay server B that the relay server information has been updated if it confirms "site" related to the second relay server B has become "active". Then, the first relay server A notifies the second relay server B that the relay server information has been updated (step S10: Notify ( )). The second relay server B updates the relay server information, and stores it therein. It should be noted that the first relay server A notifies the third relay server C as well that the relay server information has been updated (step S11: Notify ( )).

If the users of the first client terminal A1, the third client terminal B1, the fourth client terminal B2, or the fifth client terminal C1 logs onto the relay server, the relay server information of the relay server is updated similarly. In addition, similarly, if the user of the client terminals logs off, the relay server information in the relay server is updated.

Also, the update of the relay server information is notified to the client terminals that are logging on.

Figure 17:
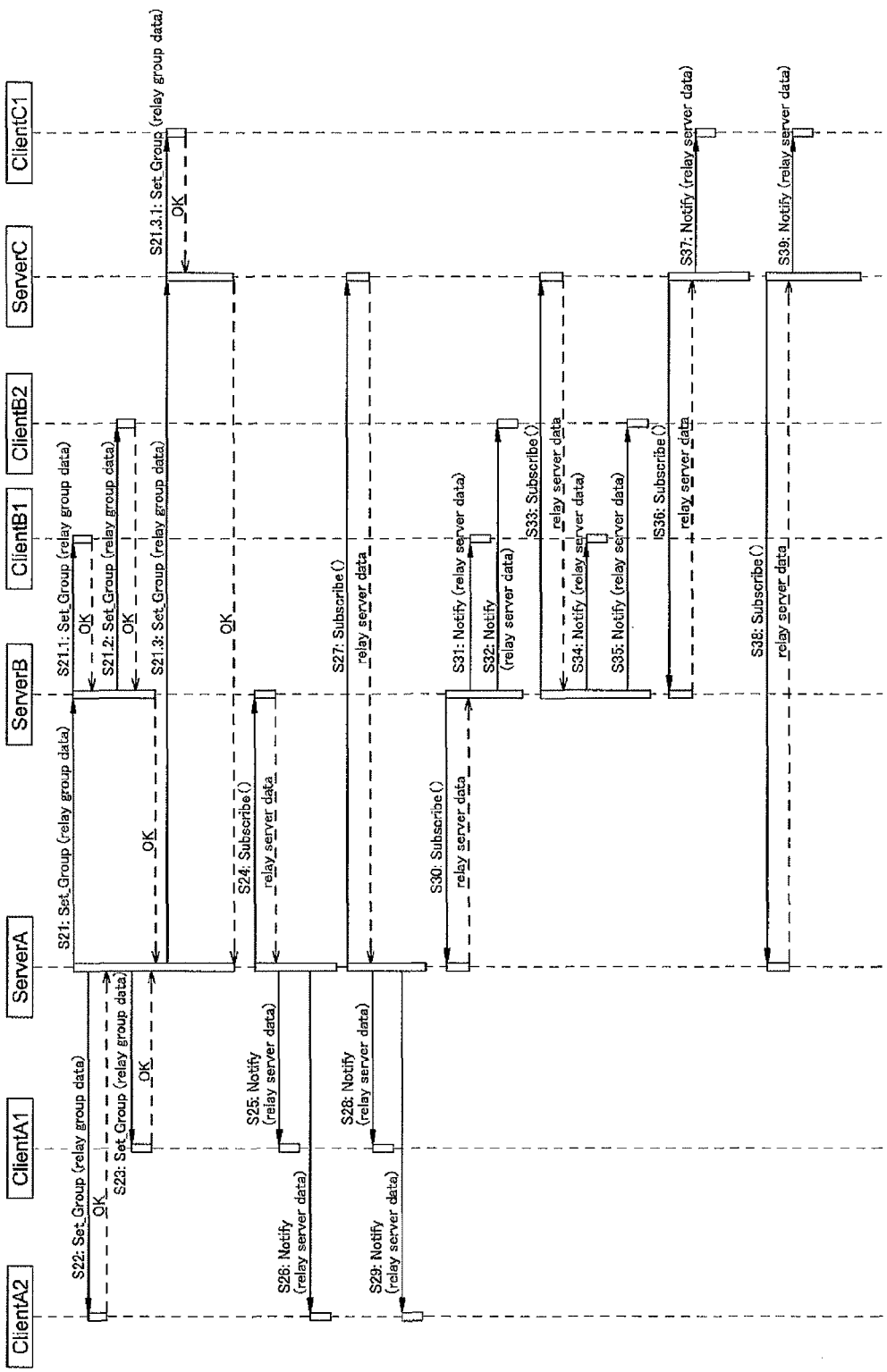
FIG. 17 is a view showing a flow process related to the sharing relay group information and relay server information according to a preferred embodiment of the present invention.

The share process when the information of the relay group is changed will be described with reference to FIG. 17. FIG. 17 is a view showing a flow of process related to the sharing of the relay group information and the relay server information in accordance with a preferred embodiment of the present invention.

In FIG. 17, if the first relay group is changed, the first relay server A transmits the changed relay group information to the second relay server B, for example (step S21: Set_Group (relay group information)). Then, the second relay server B transmits the relay group information to the third client terminal B1 and the fourth client terminal B2 (step S21.1 and step S21.2: Set_Group (relay group information)). If the OKs return from the third client terminal B1 and the fourth client terminal B2, the second relay server B returns OK to the first relay server A.

Furthermore, the first relay server A transmits the changed relay group information to the second client terminal A2 (step S22: Set_Group (relay group information)). The second client terminal A2 returns OK to the first relay server A. The first relay server A transmits the changed relay group information to the first client terminal A1 (step S23: Set_Group (relay group information)). The first client terminal A1 returns OK to the first relay server A.

The first relay server A transmits the changed relay group information to the third relay server C (step S21.3: Set_Group (relay group information)). Then, the third relay server C transmits the relay group information to the fifth client terminal C1 (step S21.3.1: Set_Group (relay group information)). If OK returns from the fifth client terminal C1, the third relay server C returns OK to the first relay server A.

According to the above-described processes, the whole of the relay servers and the client terminals share the relay group information.

The sharing of the relay server information will be described with reference again to FIG. 17. In this example, the process for sharing preferably uses a framework of event notification. In the event notification, a subscriber is an agent who requests state notification of a resource, a notifier is an agent who provides notification of a status of the resource. If the status of the resource is changed during the subscription period, the notifier notifies the subscriber of the change.

The first relay server A subscribes the relay server information to the second relay server B (step S24: Subscribe ( )). If the status indicated by the relay server information has been changed, the second relay server B updates the relay server information held by the second relay server B. Then, the second relay server B transmits the updated relay server information to the first relay server A. The first relay server A updates the relay server information using the relay server information transmitted from the second relay server B. The first relay server A notifies the first client terminal A1 that the relay server information has been updated (step S25: Notify (relay server information)), and then notifies the second client terminal A2 (step S26: Notify (relay server information)).

Next, the first relay server A subscribes the relay server information to the third relay server C (step S27: Subscribe ( )). If the status indicated by the relay server information has been changed, the third relay server C updates the relay server information held by the third relay server C. Then, the third relay server C transmits the updated relay server information to the first relay server A. The first relay server A updates the relay server information using the relay server information transmitted from the third relay server C. The first relay server A notifies the first client terminal A1 that the relay server information has been updated (step S28: Notify (relay server information)), and notifies the second client terminal A2 (step S29: Notify (relay server information)).

The second relay server B subscribes the relay server information to the first relay server A (step S30: Subscribe ( )). If the status indicated by the relay server information has been changed, the first relay server A updates the relay server information held by the first relay server A. Then, the first relay server A transmits the updated relay server information to the second relay server B. The second relay server B updates the relay server information using the relay server information transmitted from the first relay server A. The second relay server B notifies the third client terminal B1 that the relay server information has been updated (step S31: Notify (relay server information)), and then notifies the fourth client terminal B2 (step S32: Notify (relay server information)).

The second relay server B subscribes the relay server information to the third relay server C (step S33: Subscribe ( )). If the status indicated by the relay server information is changed, the third relay server C updates the relay server information held by the third relay server C. Then, the third relay server C transmits the updated relay server information to the second relay server B. The second relay server B updates the relay server information using the relay server information transmitted from the third relay server C. The second relay server B notifies the third client terminal B1 that the relay server information has been updated (step S34: Notify (relay server information)), and then notifies the fourth client terminal B2 (step S35: Notify (relay server information)).

The third relay server C subscribes the relay server information to the second relay server B (step S36: Subscribe ( )). If the status indicated by the relay server information is changed, the second relay server B updates the relay server information held by the second relay server B. Then, the second relay server B transmits the updated relay server information to the third relay server C. The third relay server C updates the relay server information using the relay server information transmitted from the second relay server B. The third relay server C notifies the fifth client terminal C1 that the relay server information has been updated (step S37: Notify (relay server information)).

The third relay server C subscribes the relay server information to the first relay server A (step S38: Subscribe ( )). If the status indicated by relay server information is changed, the first relay server A updates the relay server information held by the first relay server A. Then, the first relay server A transmits the updated relay server information to the third relay server C. The third relay server C updates the relay server information using the relay server information transmitted from the first relay server A. The third relay server C notifies the fifth client terminal C1 that the relay server information has been updated (step S39: Notify (relay server information)).

According to the above-described processes, the first relay server A, the second relay server B, and the third relay server C preferably share the relay server information instantly when the relay server information is updated. Accordingly, the first relay server A, the second relay server B, and the third relay server C can preferably always know activation states of the other relay servers, and kinds and log-on status of the client terminals connected to relay servers.

In the relay communication system according to a preferred embodiment of the present invention, if the number and the connection states of the LANs and the client terminals are changed, one relay server instantly updates the relay group information, the relay server information, and the client terminal information depending on its content when recognizing the changes in state.

Then, one relay server instantly notifies other relay servers recited in the relay group information and the relay server information that the relay group information and the relay server information have been updated. In addition, one relay server instantly notifies the client terminals recited in the client terminal information that the relay group information, and the relay server information, have been updated.

However, one relay server will not instantly notify the other relay servers when it is determined that the other relay server is an unconnected state even if the other relay server is recited in the relay group information and the relay server information. In addition, one relay server will not instantly notify the client terminals when it is determined that the client terminals are in an unconnected state even if the client terminal is recited in the client terminal information.

Accordingly, information on changes in the number and the connection states of the LANs and the client terminals is preferably shared in the whole relay communication system in real time or substantially in real time.

After the information on the changes in the number and the connection states of the LANs and the client terminals in the relay communication system is shared, assume that a user using the client terminal appoints another client terminal for communication. In this case, the data is transmitted and received as follows.

Specifically, the client terminal transmits a communication packet including the client terminal information of the client information of the specified destination and data to be transmitted, to a relay server to which the client terminal is connected. The relay server, which has received the communication packet, refers to the relay server information, and confirms under which relay server in the relay group the appointed client terminal exists. In addition, the relay server confirms whether or not the relay server with the client terminals under the control thereof is in an activated state, and confirms whether or not the appointed client terminal is in a log-on state. Specifically, it is possible to determine that the relay sever is in an activated state by confirming "stat" of the upper information of the relay server information is set to "active". It is also possible to determine that the client terminal is in a logging-on state by confirming that the lower information "site" of the relay server information recites identification information of the relay server to which the client terminal logs on.

If it is confirmed that the relay server is in an active state and the client terminal is in the logging-on state, the received communication packet is transmitted to the relay server with the appointed client terminal under the control thereof. In addition, the relay server, which has received communication packet, transmits the communication packet to the client terminal under the control of the relay server.

Figure 18:
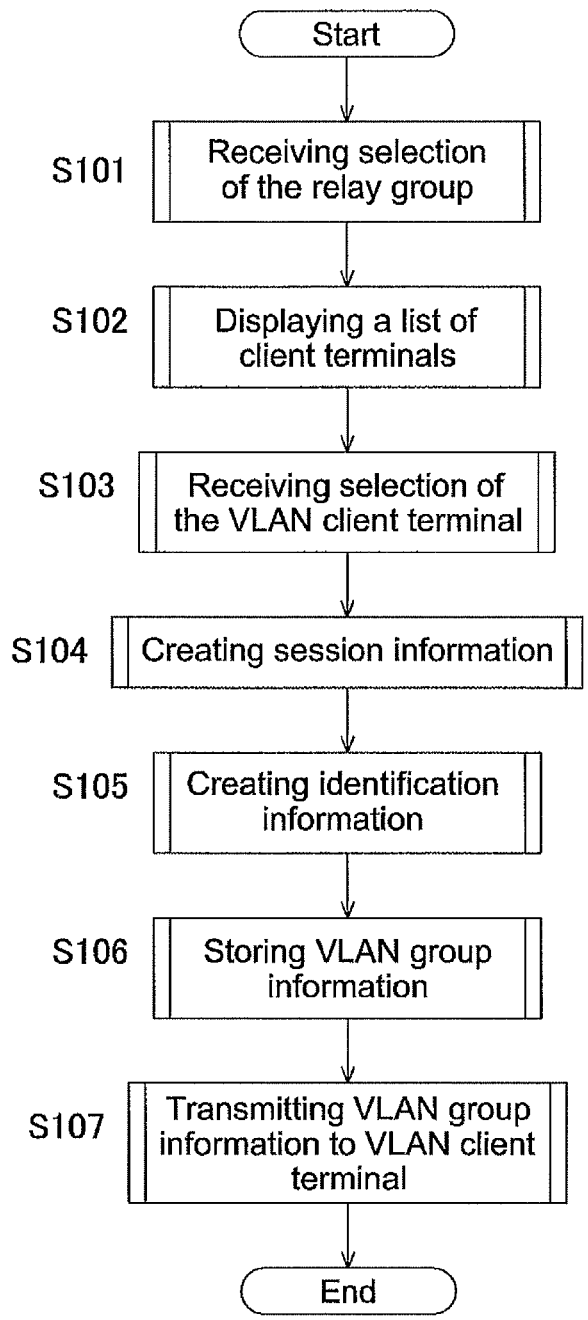
FIG. 18 is a flowchart showing a process that creates VLAN group information according to a preferred embodiment of the present invention.

Next, the creation and the sharing of the VLAN group information will be described with reference to FIG. 18. FIG. 18 is a flowchart showing a process of creating the VLAN group information in accordance with a preferred embodiment of the present invention. In a following example, while the information on the changes in the number and the connection states of the LANs and the client terminals are shared in the first relay group (refer to FIG. 17), the first client terminal A1 creates the VLAN group information. In addition, in this example, the first client terminal A1, the third client terminal B1, the fourth client terminal B2, and the fifth client terminal C1 in the first relay group are selected as the VLAN client terminals.

First, the VLAN group information creating section 232a of the VLAN group information control unit 232 in the first client terminal A1 receives selection of the relay group from a user (step S101). For example, the user selects a relay group by referring to the relay group information stored in the relay group information storage unit 241 with the display unit 224 and the operation input unit 225 of the first client terminal A1. In this example, the first relay group is selected as a relay group.

The VLAN group information creating section 232a extracts identification information of the first relay group by referring to the relay server information stored in the relay server information storage unit 242 when receiving the selection of the first relay group. It should be noted that the relay group information may be referred to instead of the relay server information.

When receiving the selection of the first relay group, the VLAN group information creating section 232a refers to the relay server information, and displays a list of the client terminals including the first relay group on the display unit 224 (step S102). After that, VLAN group information creating section 232a receives the selection of the VLAN client terminal from a user through the operation input unit 225 (step S103). At this time, the VLAN group information creating section 232a refers to the relay server information, and extracts identification information of the VLAN client terminal which has received the selection.

The VLAN group information creating section 232a creates session information after receiving the selection of the VLAN client terminal (step S104). Specifically, the VLAN group information creating section 232a determines a route configuration among the relay servers for establishing the hub session, and creates the session information.

For example, the VLAN group information creating section 232a determines that, the first relay server A is on a connecting-side, and the second relay server B is on a connected-side, regarding a session between the first relay server A and the second relay server B. Then, the VLAN group information creating section 232a inputs the identification number of the first relay server A into "sp", and inputs the identification number of the first relay server B into "ep". It should be noted that the session information created by the VLAN group information creating section 232a may be corrected by a user through the operation input unit 225 or the like.

After creating the session information, the VLAN group information creating section 232a creates identification information for identifying the VLAN group (step S105). After that, the VLAN group information creating section 232a stores the VLAN group information in VLAN group information storage unit 244, including the created identification information of the VLAN group, identification information of the VLAN client terminal, and the session information (step S106).

An example of the VLAN group information created in this process is VLAN group information 70 shown in FIG. 11. As described above, the VLAN group information 70 preferably includes the group information 71, the VLAN client terminal information 72, and the session information 73. Specifically, the group information 71 preferably includes "1279671471393.clientA1.rd.002@trial.net" as identification information of the first relay group. The group information 71 preferably includes "1279672104671.clientA1.rd.002@trial.net" as the VLAN group identification information and "vlangroup1" as name of the VLAN group. Below, the VLAN group indicated by the VLAN group information 70 will be called as a first VLAN group.

The VLAN client terminal information 72 shows identification information of the first client terminal A1, the third client terminal B1, the fourth client terminal B2, and the fifth client terminal C1, which have been selected by the user.

In addition, the session information 73 preferably includes session information in which "sp" is the first relay server A and "ep" is the second relay server B. The session information 73 includes session information in which "sp" is the first relay server A and "ep" is the third relay server C, and session information in which "sp" is the second relay server B and "ep" is the third relay server C.

The VLAN group information 70 is, after being created as described above, transmitted to the VLAN client terminal (step S107).

Figure 19:
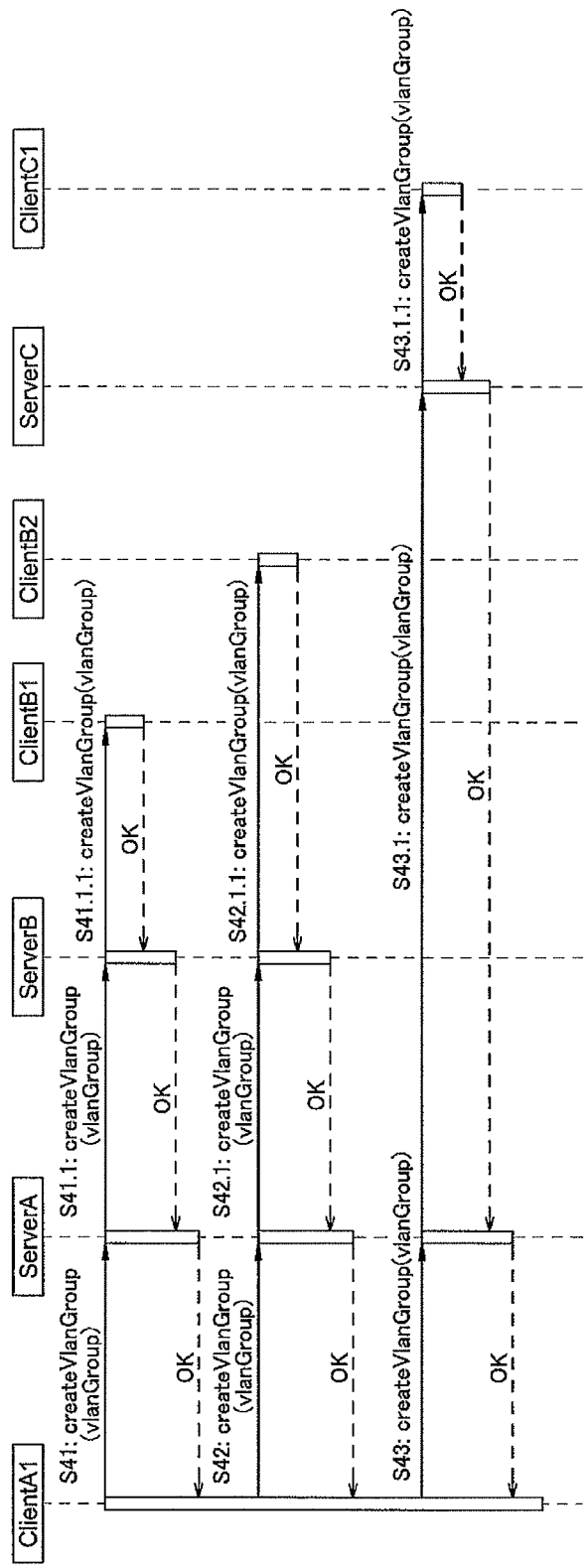
FIG. 19 is a view showing a flow process related to sharing VLAN group information according to a preferred embodiment of the present invention.

Next, with reference to the sequence diagram of FIG. 19, a process will be described in which the VLAN group information 70 is shared among VLAN client terminals. FIG. 19 is a view of showing a flow of process of sharing the VLAN group information in accordance with a preferred embodiment of the present invention. The process related to the sharing of the VLAN group information 70 is controlled by the VLAN group information control unit 132 of the relay servers and the VLAN group information control unit 232 of the client terminals.

The first client terminal A1, which has created the VLAN group information 70, transmits the VLAN group information 70 to the third client terminal B1 as a VLAN client terminal. Specifically, the first client terminal A1 first transmits the VLAN group information 70 to the first relay server A (step S41: createVlanGroup (vlanGroup)). The first relay server A transmits the received VLAN group information 70 to the second relay server B (step S41.1: createVlanGroup (vlanGroup)). The second relay server B transmits the VLAN group information 70 to the third client terminal B1 (step S41.1.1: createVlanGroup (vlanGroup)). After receiving the VLAN group information 70, the third client terminal B1 stores the received VLAN group information 70 in the VLAN group information storage unit 244, and returns OK to the second relay server B. In addition, the second relay server B returns OK to the first relay server A, and the first relay server A returns OK to the first client terminal A1.

Next, the first client terminal A1 transmits the VLAN group information 70 to the fourth client terminal B2 as a VLAN client terminal. Specifically, the first client terminal A1 transmits the VLAN group information 70 to the first relay server A (step S42: createVlanGroup (vlanGroup)). The first relay server A transmits the received VLAN group information 70 to the second relay server B (step S42.1: createVlanGroup (vlanGroup)). The second relay server B transmits the received VLAN group information 70 to the fourth client terminal B2 (step S42.1.1: createVlanGroup (vlanGroup)). After receiving the VLAN group information 70, the fourth client terminal B2 stores the received VLAN group information 70 in the VLAN group information storage unit 244, and returns OK to the second relay server B. In addition, the second relay server B returns OK to the first relay server A, and the first relay server A returns OK to the first client terminal A1.

Furthermore, the first client terminal A1 transmits the VLAN group information 70 to the fifth client terminal C1. Specifically, the first client terminal A1 transmits the VLAN group information 70 to the first relay server A (step S43: createVlanGroup (vlanGroup)). The first relay server A transmits the received VLAN group information 70 to the third relay server C (step S43.1: createVlanGroup (vlanGroup)). The third relay server C transmits the received VLAN group information to the fifth client terminal C1 (step S43.1.1: createVlanGroup (vlanGroup)). After receiving the VLAN group information 70, the fifth client terminal C1 stores the received VLAN group information 70 in the VLAN group information storage unit 244, and returns OK to the third relay server C. In addition, the third relay server C returns OK to the first relay server A, and the first relay server A returns OK to the first client terminal A1.

According to the above-described processes, all of the VLAN client terminals selected as client terminals defining the VLAN group share the VLAN group information 70. Accordingly, the preparation is performed for the VLAN session among the client terminals within the VLAN group.

It should be noted that, in the above-described process, the VLAN group information 70 may be shared among the relay servers to which the VLAN client terminals are connected as well as among the VLAN client terminals. In this case, when receiving the VLAN group information 70, the relay server preferably stores the VLAN group information 70 in the VLAN group information storage unit 144.

Figure 20A:
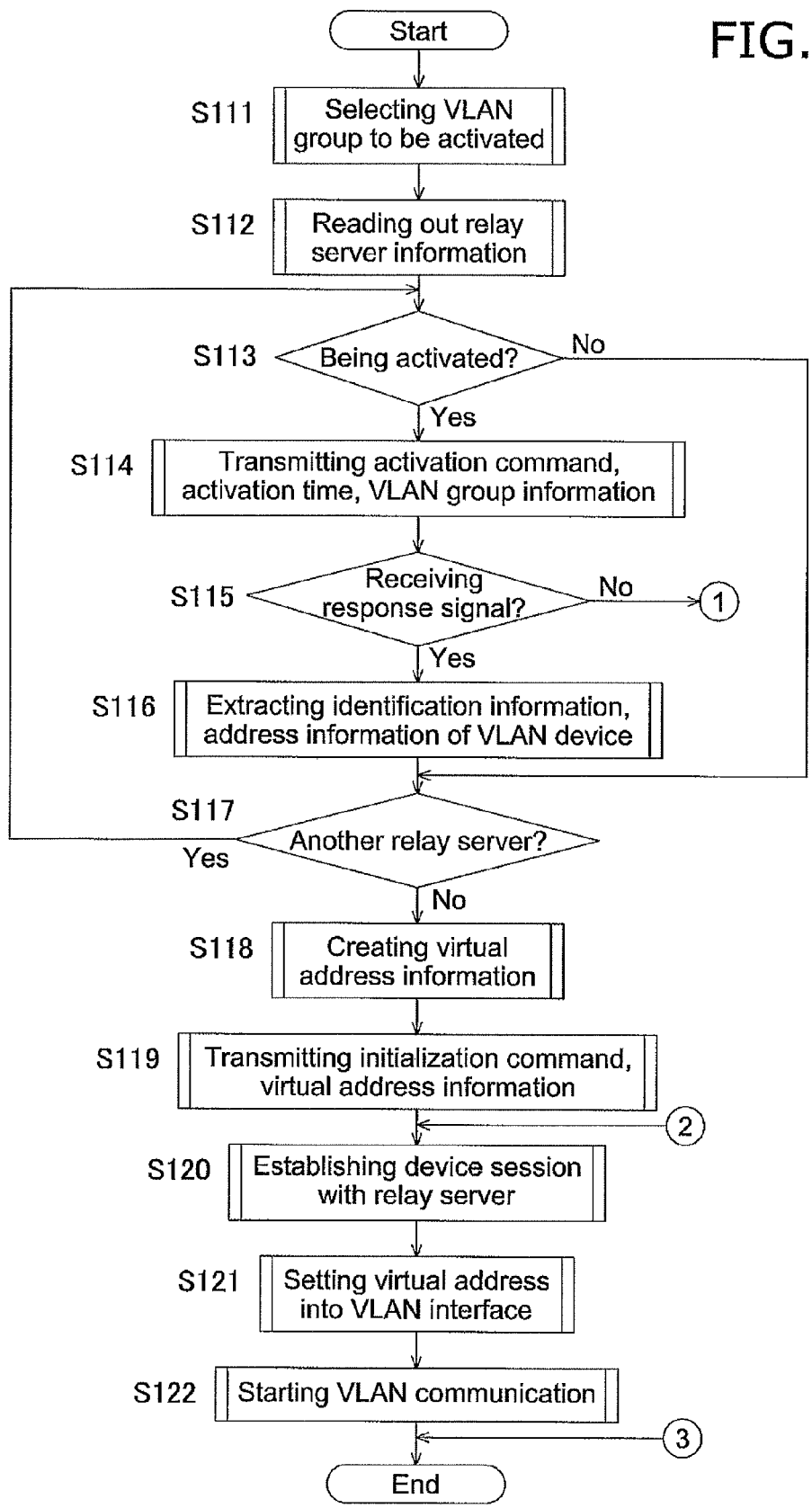
FIG. 20A is a first portion of a flowchart showing a process of establishing a VLAN session by a client terminal according to a preferred embodiment of the present invention.
Figure 20B:
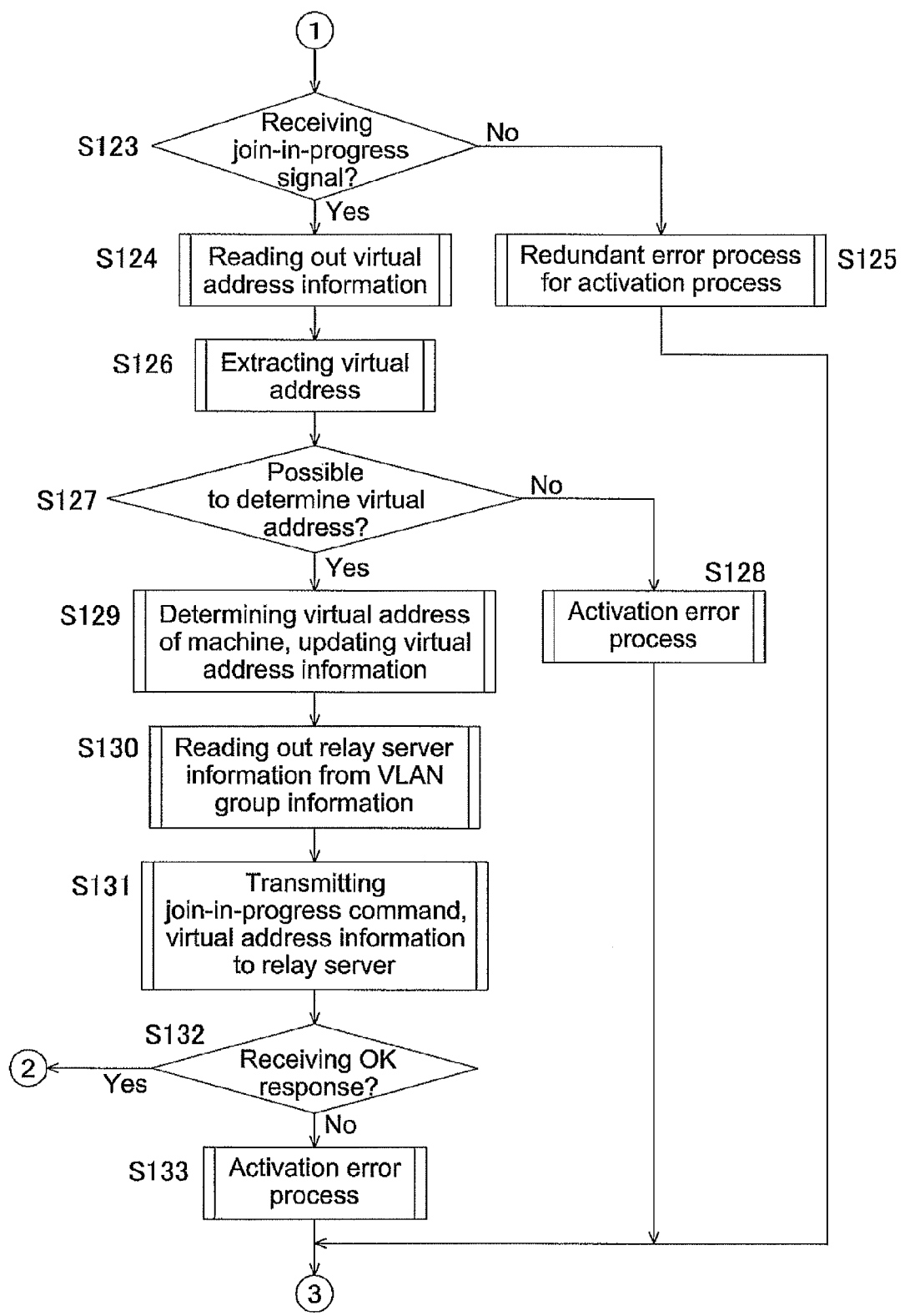
FIG. 20B is a second portion of the flowchart showing a process of establishing a VLAN session by a client terminal according to the preferred embodiment of the present invention.

In a relay communication system of a preferred embodiment of the present invention, a VLAN session is established in accordance with the VLAN group information 70 created and shared according to the above-described processes, so that the client terminals can communicate with each other as VLAN devices via a plurality of relay servers as a hub. Hereinafter, processes of establishing the VLAN session process and starting of the VLAN communication in a client terminal which receives activation instruction of the VLAN group information will be described with reference to FIG. 20A and FIG. 20B. FIG. 20A and FIG. 20B show a flowchart showing a process of establishing the VLAN session by the client terminal in accordance with a preferred embodiment of the present invention.

When a VLAN client terminal defining the VLAN group or a relay server to which the VLAN client terminal is connected receives an activation instruction of the VLAN group from a user, the process of establishing the VLAN session is started. In this example, the first client terminal A1 receives an activation instruction of the first VLAN groups indicated in the VLAN group information 70 from a user. In this case, the first client terminal A1, the third client terminal B1, and the fifth client terminal C1 are VLAN devices.

First, the activation command control unit 233 of the first client terminal A1 receives selection of the VLAN group to be activated (step S111). Specifically, the activation command control unit 233 displays on the display unit 224 a list of the VLAN group information stored in the VLAN group information storage unit 244, and receives a selection of the VLAN group to be activated via the operation input unit 225. In this example, the first VLAN group indicated by the VLAN group information 70 is selected.

After receiving the selection of the first VLAN group, the activation command control unit 233 reads out the information of the relay server from the VLAN group information 70 (step S112). Specifically, the activation command control unit 233 reads out identification information of a relay server which serves as a hub from the session information 73 of the VLAN group information 70. At this time, the activation command control unit 233 reads out the information via a filtering unit such that the identification information of the relay servers are not overlapped with each other. In this example, the activation command control unit 233 reads out the identification information of the first relay server A, the second relay server B, and the third relay server C.

Next, the activation command control unit 233 performs processes of step S113 through step S116. Specifically, the activation command control unit 233 refers to the relay server information stored in the relay server information storage unit 242, and determines whether or not a relay sever among the read-out relay servers is activated to which a VLAN client terminal other than the first client terminal A1 is connected (step S113). Then, the activation command control unit 233 performs a process of step S114 through step S116 on the activated relay servers. In this example, the processes of step S114 through step S116 are preferably performed on the second relay server B and the third relay server C, which relay servers to which the VLAN client terminals are connected except the first client terminal A1.

First, the activation command control unit 233 refers to the relay server information stored in the relay server information storage unit 242, and determines whether or not the second relay server B is activated. Specifically, the activation command control unit 233 confirms that the upper information "stat" of the relay server information is set as "active" in order to determine whether or not the second relay server B is activatable. If the second relay server B is activated, the activation command control unit 233 transmits activation information including the activation command, the activation time and the VLAN group information 70 to the second relay server B (step S114). The activation command is a command of notifying the activation of the VLAN group.

At this time, the second relay server B, after receiving the activation information, stores the VLAN group information 70 in the VLAN group information storage unit 144. On the other hand, according to the sharing process of the VLAN group information, if the VLAN group information 70 is shared not only among the VLAN client terminals but also between the second relay server B and the third relay server C, it is acceptable that the transmission of the VLAN group information 70 may be omitted, and only the identification information of the first VLAN group may be transmitted.

Next, the activation command control unit 233 receives a response signal from the second relay server B. Here, the response signal from the second relay server B includes the identification information, the IP address and the MAC address of the VLAN device among the VLAN client terminals connected to the second relay server B. The process of creating the response signal by the second relay server B will be described later.

The activation command control unit 233, after receiving the response signal from the second relay server B (Yes at step S115), extracts the identification information, the IP address, and the MAC address of the VLAN device from the received response signal (step S116).

After that, the activation command control unit 233 refers to the relay server information again, and determines whether or not there is another relay server by which the processes of step S113 through step S116 should be performed (step S117). If there is another relay server (Yes at step S117), the activation command control unit 233 performs processes of step S113 through step S116 on the other relay servers.

Hereinafter, at step S115, an example will be described in which a response signal is received from the second relay server B and the third relay server C.

FIG. 21 shows an example of the first extraction information related to the IP address and the MAC address of the VLAN device according to a preferred embodiment of the present invention. The first extraction information 90 preferably includes the identification information, the IP address and the MAC address of the VLAN device extracted from the response signal at step S116. The first extraction information 90-1 shown in FIG. 21 is the extraction information extracted from the response signal received from the second relay server B, and the first extraction information 90-2 is the extracted signal extracted from the response signal received from the third relay server C. The first extraction information 90-1 includes identification information, the IP address and the MAC address of the third client terminal B1, which are VLAN devices connected to the second relay server B. The first extraction information 90-2 includes the identification information, the IP address and the MAC address of the fifth client terminal C1, which is a VLAN device connected to the third relay server C.

If it is determined that the relay server is not activated (No at step S113), a process proceeds to step S117.

If it is determined that the other relay server exists (No at step S117), then the virtual address creating unit 234a of the virtual address control unit 234 creates the virtual address information (step S118). The virtual address information includes virtual IP address and virtual MAC address to be given to the VLAN devices.

A process of creating the virtual address will be described with reference to FIG. 12, FIG. 21 and FIG. 22. FIG. 22 shows an example of the second extraction information, which is formed by adding the IP address and the MAC address of the first client terminal A1 to the first extraction information in FIG. 21 in accordance with a preferred embodiment of the present invention.

The virtual address creating unit 234a preferably first adds the identification information, the IP address and MAC address of the first client terminal A1 to the first extraction information 90. Then, the virtual address creating unit 234a creates the second extraction information 91 that includes all of information of the first client terminal A1 and the VLAN devices extracted at step S116. As shown in FIG. 22, in the second extraction information 91, the identification information, the IP address and the MAC address of the first client terminal A1, the third client terminal B1, and the fifth client terminal C1 are combined in one table.

Next, the virtual address creating unit 234a creates virtual address information, based on the IP address and MAC address indicated by the second extraction information 91. Specifically, the virtual address creating unit 234a assigns IP address that is not overlapped with IP address indicated by the second extraction information 91 to the VLAN devices, as virtual IP addresses. In addition, the virtual address creating unit 234a assigns MAC address that is not overlapped with the MAC address indicated by the second extraction information 91 to the VLAN devices, as a virtual MAC address. In addition, the virtual address creating unit 234a assigns the virtual IP address and the virtual MAC address to the VLAN devices such that the virtual IP address and the virtual MAC address are not overlapped with each other among the VLAN devices. In this example, different numbers are given to the end of the virtual IP address and the virtual MAC address in order not to overlap the virtual addresses among the VLAN devices.

The virtual address information created according to the above-described process is virtual address information 80 shown in FIG. 12. In this example, virtual IP address "117.112.0.1", and virtual MAC address "00.11.22:f0.00.01" are preferably assigned to the first client terminal A1 identified by identification information "clientA1.rd.002@trial.net". In addition, virtual IP address "117.112.0.2", and virtual MAC address "00.11.22:f0.00.02" are preferably assigned to the third client terminal B1, which is identified by identification information "clientB1.rd.002@trial.net". Virtual IP address "117.112.0.3" and virtual MAC address "00.11.22:f0.00.03" are preferably assigned to the fifth client terminal C1, which is identified by identification information "clientC1.rd.002@trial.net".

Next, the virtual address control unit 234 transmits the created virtual address information 80 with the initialization command to a relay server defining the hub (step S119). The initialization command is a command related to initialization of the VLAN interface, and preferably includes "1279672104671.clientA1.rd.002@trial.net" as identification information of the first VLAN group. In this example, the virtual address control unit 234 transmits the created virtual address information 80 and the initialization command to the first relay server A, the second relay server B, and the third relay server C. At this time, the first relay server A, the second relay server B, and the third relay server C, which have received the virtual address information 80 and the initialization command, refer to the session information 73 of the VLAN group information 70, and establish a hub session among the relay servers. The establishment of the hub session among the relay servers will be described later in detail.

After that, the VLAN session control unit 237 preferably performs a process of establishing a device session with the first relay server A (step S120). In detail, OK is returned corresponding to the request of establishing the device session from the first relay server A, allowing the device session to serve as a VLAN session. At this time, a device session is established between the second relay server B and the third client terminal B1. A device session is also established between the third relay server C and the fifth client terminal C1.

As described above, in the VLAN group, when the VLAN session is established including the hub session and the device session, the VLAN session control unit 237 initializes the VLAN interface 221B of the first client terminal A1, and sets the virtual address for the VLAN interface 221B. Specifically, the VLAN session control unit 237 sets the virtual IP address and the virtual MAC address of the virtual address information 80 in the VLAN interface 221B of the first client terminal A1 (step S121). At this time, the third client terminal B1, and the fifth client terminal C1 also preferably set the virtual IP address and virtual MAC address of the virtual address information 80 in the VLAN interface of the first client terminal A1 (step S121).

When the virtual address is set in the VLAN devices according to the above-described process using the virtual address and the VLAN session, the client terminals can communicate with each other as VLAN devices (step S122).

In the above-described example, when the first client terminal A1 is to transmit the activation information upon receiving the selection of the activation of the first VLAN group, the first VLAN group may have been activated in accordance with the activation instruction from the other client terminal or the relay server. In this case, in order to address the overlapped activation of the VLAN groups, the following process is performed.

If the first VLAN group has been already activated, a response signal (refer to step S114) is not transmitted in response to the transmission of the activation information from the second relay server B and/or the third relay server C. Accordingly, the activation command control unit 233 does not receive the response signal (No at step S115), and determines whether or not it has received join-in-progress signal from the second relay server B and/or the third relay server C (step S123). The join-in-progress signal is a signal permitting the first client terminal A1 to join in-progress with the first VLAN group. The join-in-progress signal preferably includes the virtual address information, which has been already created by the previous activation of the first VLAN group.

Whether or not the first client terminal A1 is arranged to join in-progress with the first VLAN group is determined by any of the relay servers, to which the VLAN client terminal is connected and which has been activated. For example, if the second relay server B determines the join-in-progress, the second relay server B transmits the join-in-progress signal to the first client terminal A1 via the first relay server A. The transmission of the join-in-progress signal by the relay server will be described later in detail.

If the join-in-progress signal is not received from the second relay server B (No at step S123), the activation command control unit 233 executes a process of overlap error of the activation process to finish the activation process (step S125).

On the other hand, if the join-in-progress signal is received, then, the virtual address control unit 234 reads out virtual address information that has been received together with the join-in-progress signal (step S124), and extracts the virtual IP address and the virtual MAC address assigned to the VLAN devices, from the virtual address information (step S126).

Next, the virtual address control unit 234 refers to the extracted virtual IP address and virtual MAC address, and determines whether or not the virtual address can be determined for the first client terminal A1 (step S127). Specifically, the virtual address control unit 234 preferably determines whether or not the IP address which the first client terminal A1 is currently using belongs to the same address system as that of the extracted virtual IP address. Furthermore, the virtual address control unit 234 determines whether or not the MAC address which the first client terminal A1 is currently using belongs to the same address system as that of the extracted virtual MAC address. If the address segment of the first client terminal A1 is the same as that of the virtual address, the virtual address control unit 234 finishes the process of joining in-progress the VLAN group because it determines that the activation error happens (step S128).

On the other hand, if IP address and MAC address of the first client terminal A1 and the virtual IP address and the virtual MAC address belong to different address systems, the virtual address control unit 234 determines the virtual address for the first client terminal A1, and updates the virtual address information (step S129). For example, the virtual address control unit 234 preferably assigns the virtual IP address and the virtual MAC address formed by changing the ends of the extracted virtual IP address and the virtual MAC address, to the first client terminal A1. Then, the virtual address control unit 234 updates the virtual address information by adding the assigned virtual IP address and virtual MAC address as well as the identification information of the first client terminal A1 to the virtual address information (step S130).

After updating the virtual address information, the virtual address control unit 234 transmits the updated virtual address information and join-in-progress command to the first relay server A (step S131). The join-in-progress command is a command showing the join-in-progress to the VLAN, and includes the identification information of the VLAN group.

If receiving an OK response from the first relay server A (Yes at step S132), a process proceeds to step S120, and the VLAN session control unit 237 performs a process of establishing a device session with the first relay server A. On the other hand, if no OK response is received from the first relay server A (No at step S132), the virtual address control unit 234 determines that the activation error happens and finishes the process (step S133).

The updated virtual address information and join-in-progress command are transmitted to the VLAN devices via the relay servers after that.

The execution of the above-described process is preferably used to address the overlapping of the activation of the first VLAN group. Furthermore, even if the activation instructions of the first VLAN group are overlapped with each other, the client terminal which has transmitted the activation instruction later is arranged to join in-progress with the first VLAN group if the address which the client terminal uses and the virtual address previously created by the activation of the first VLAN group do not belong to the same address system.

Next, a process of establishing the VLAN session process and starting of the VLAN communication in the relay server which has received the activation information from a client terminal which has accepted the activation instruction of the VLAN group, will be described. In this example, a process by the second relay server B, which has received the activation information including the activation command, the activation time and the VLAN group information 70 from the first client terminal A1 (refer to step S114 in FIG. 20). It should be noted that a process by the third relay server C, which has received the activation information from the first client terminal A1, will be omitted because it is similar to the process of the second relay server B.

Figure 23A:
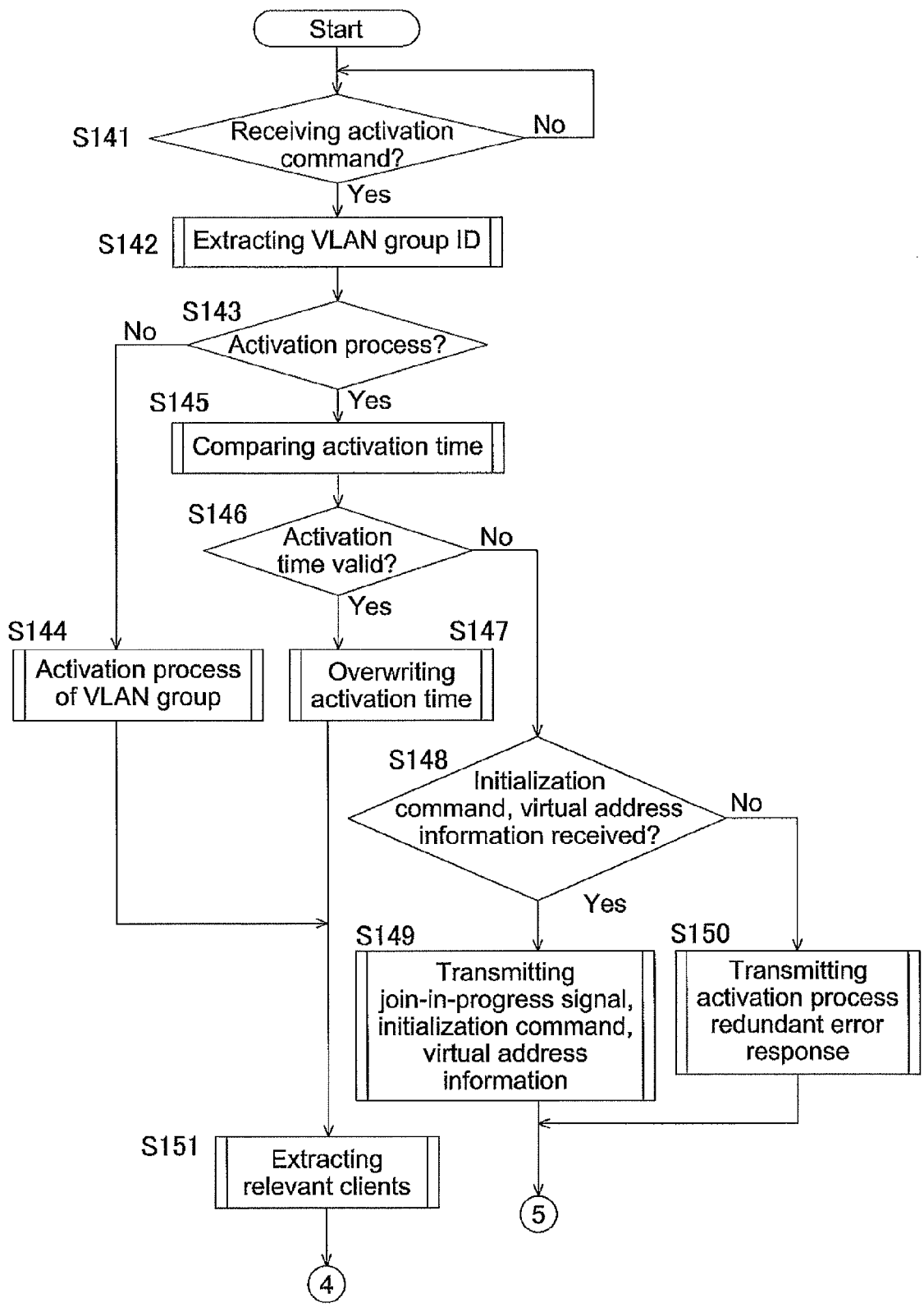
FIG. 23A is a first portion of a flowchart showing a process of transmitting a response signal by the relay serer in response to the initialization command according to a preferred embodiment of the present invention.
Figure 23B:
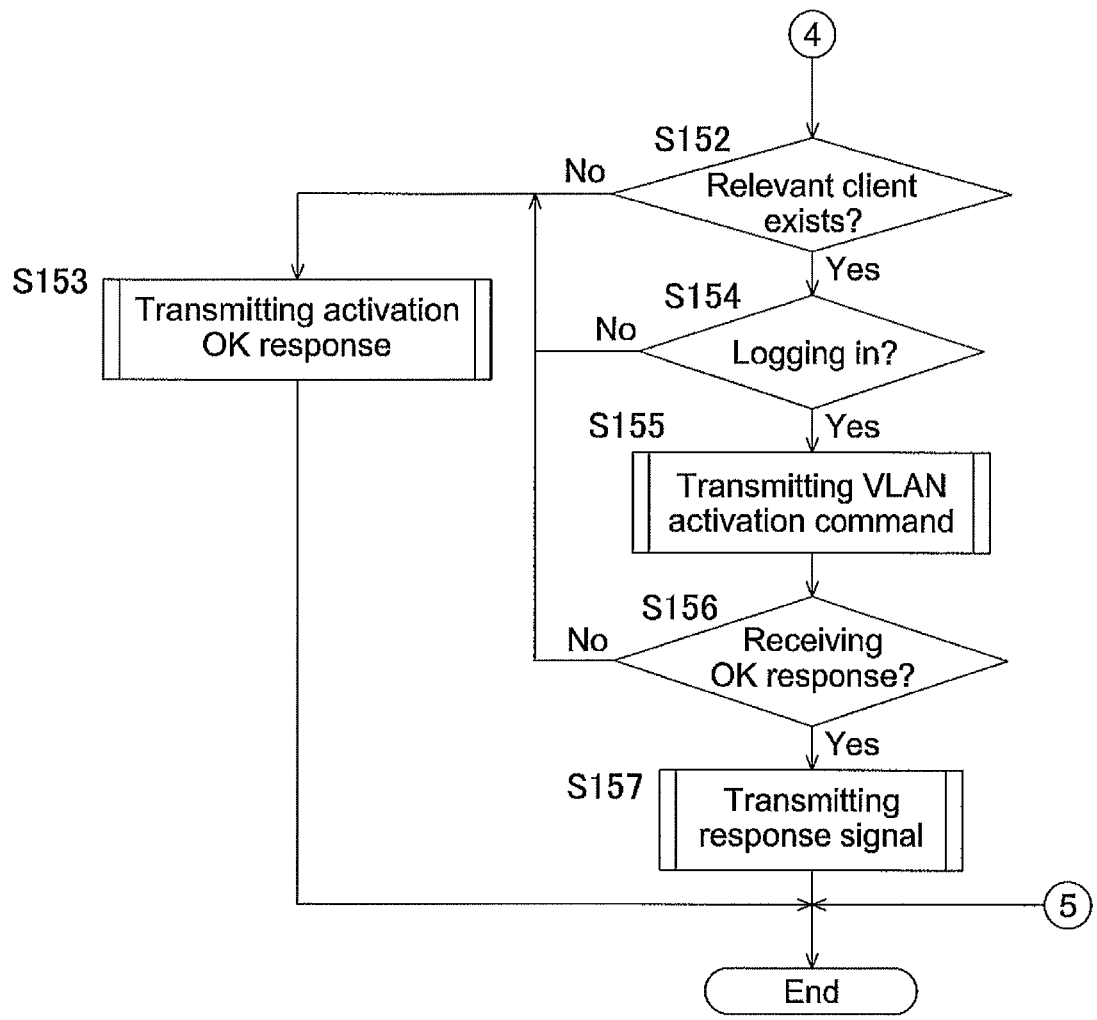
FIG. 23B is a second portion of the flowchart showing a process of transmitting a response signal by the relay serer in response to the initialization command according to a preferred embodiment of the present invention.

First, referring to FIG. 23A and FIG. 23B, a process of transmitting a response signal by the second relay server B in response to the activation information will be explained. FIG. 23A and FIG. 23B are flowcharts showing a process of transmitting response signal by the relay server in response to the activation information according to a preferred embodiment of the present invention. The activation command control unit 133 of the second relay server B extracts the identification information of the VLAN group from the VLAN group information 70 (step S142), when receiving activation information including the activation command, the activation time and the VLAN group information 70 from the first client terminal A (Yes at step S141). In this example, the activation command control unit 133 preferably extracts, from the VLAN group information 70, identification information "1279672104671. clientA1.rd.002@trial.net". Then, the activation command control unit 133 confirms whether or not the first VLAN group, having this identification information, has been already activated (step S143). If the first VLAN group has not been activated, the activation process of the first VLAN group is started (step S144), and a process proceeds to step S151 (described later).

On the other hand, if the first VLAN group has been already activated, the activation command control unit 133 compares the activation time received from the first client terminal A1 with the activation time included in the previously received activation information of the first VLAN group (step S145). If the activation time received from the first client terminal A1 is valid (Yes at step S146), the activation command control unit 133 overwrites the already received activation time with the activation time received from the first client terminal A1 (step S147), and a process proceeds to step S151. Here, it is determined that earlier activation time is valid activation time.

If the activation time received from the first client terminal A1 is invalid (No at step S146), the activation command control unit 133 further determines whether or not the initialization command and the virtual address information have been received (step S148). In other words, the activation command control unit 133 determines whether or not, in the previous activation of the first VLAN group, a process of transmitting the initialization command and the virtual address information has been already executed.

If the activation command control unit 133 has received the initialization command and the virtual address information (Yes at step S148), the activation command control unit 133 transmits the join-in-progress signal, the received initialization command, and the virtual address information to the first client terminal A1 (step S149). As described above, the join-in-progress signal is a signal permitting the first client terminal A1 to join-in-progress to the VLAN group.

If the initialization command and the virtual address information have not been received (No at step S148), the activation command control unit 133 returns overlap error signal of the activation process to the first client terminal A1, and the activation process is finished (step S150). This is because if the virtual address information has not been received, it is impossible to execute a process of assigning the virtual address to the second relay server B based on the received virtual address information (refer to step S127 and step S129 in FIG. 20B).

If the activation process of the first VLAN group is started (step S144), or the overwrite process of the activation time is executed (step S147), the activation command control unit 133 preferably next executes a process of extracting the VLAN client terminals connected to the second relay server B from the VLAN group information 70 (step S151). If there is a VLAN client terminal connected to the second relay server B (Yes at step S152), the activation command control unit 133 determines whether or not the VLAN client terminal can be activated (step S154). The activatable VLAN client terminal indicates a client terminal that is currently logging in and is not currently joining other VLAN groups. Below, the VLAN terminal which is determined as activatable by the activation command control unit 133 will be called VLAN device. In this example, the activation command control unit 133 preferably extracts the third client terminal B1 as a VLAN device. When determining whether or not the client terminal is a VLAN device, the activation command control unit 133 refers to the relay server information stored in the relay server information storage unit 142, and determines whether or not the third client terminal B1 is logging in. In addition, the activation command control unit 133 transmits the activation command to the third client terminal B1, which is logging in. Then, if the activation command control unit 133 receives an OK signal in response to the activation command from the third client terminal B1, the activation command control unit 133 determines that third client terminal B1 is a VLAN device.

After that, the activation command control unit 133 transmits the VLAN activation command to the third client terminal B1 (step S155). The VLAN activation command is a command for activating the VLAN client terminal as a VLAN device. If the activation command control unit 133 receives OK response from the third client terminal B1 (Yes at step S156), the activation command control unit 133 transmits the response signal to the first client terminal A1 (step S157). The response signal includes the identification information, the IP address and the MAC address of the third client terminal B1. In this case, the activation command control unit 133 preferably executes IP communication with the third client terminal B1, which is logging in, via the LANs. Accordingly, the activation command control unit 133 does not need to ask the third client terminal B1 about the IP address and the MAC address of third client terminal B1. The first client terminal A1, which has received the response signal, creates the virtual address information 80 from the received response signal (refer to step S115 and step S116 in FIG. 20A).

If there is no VLAN client terminal connected to the second relay server B (No at step S152), the activation command control unit 133 transmits an activation OK signal to the first client terminal A1. The activation OK signal just represents OK response to the activation command which has been received. If the VLAN device does not exist (No at step S154), or if the OK response in response to the transmission of the VLAN activation command is not received (No at step S156), the activation command control unit 133 also transmits the activation OK signal.

Next, a process of establishing the VLAN session by the relay server after the virtual address information is created by the client terminal will be described.

Figure 24:
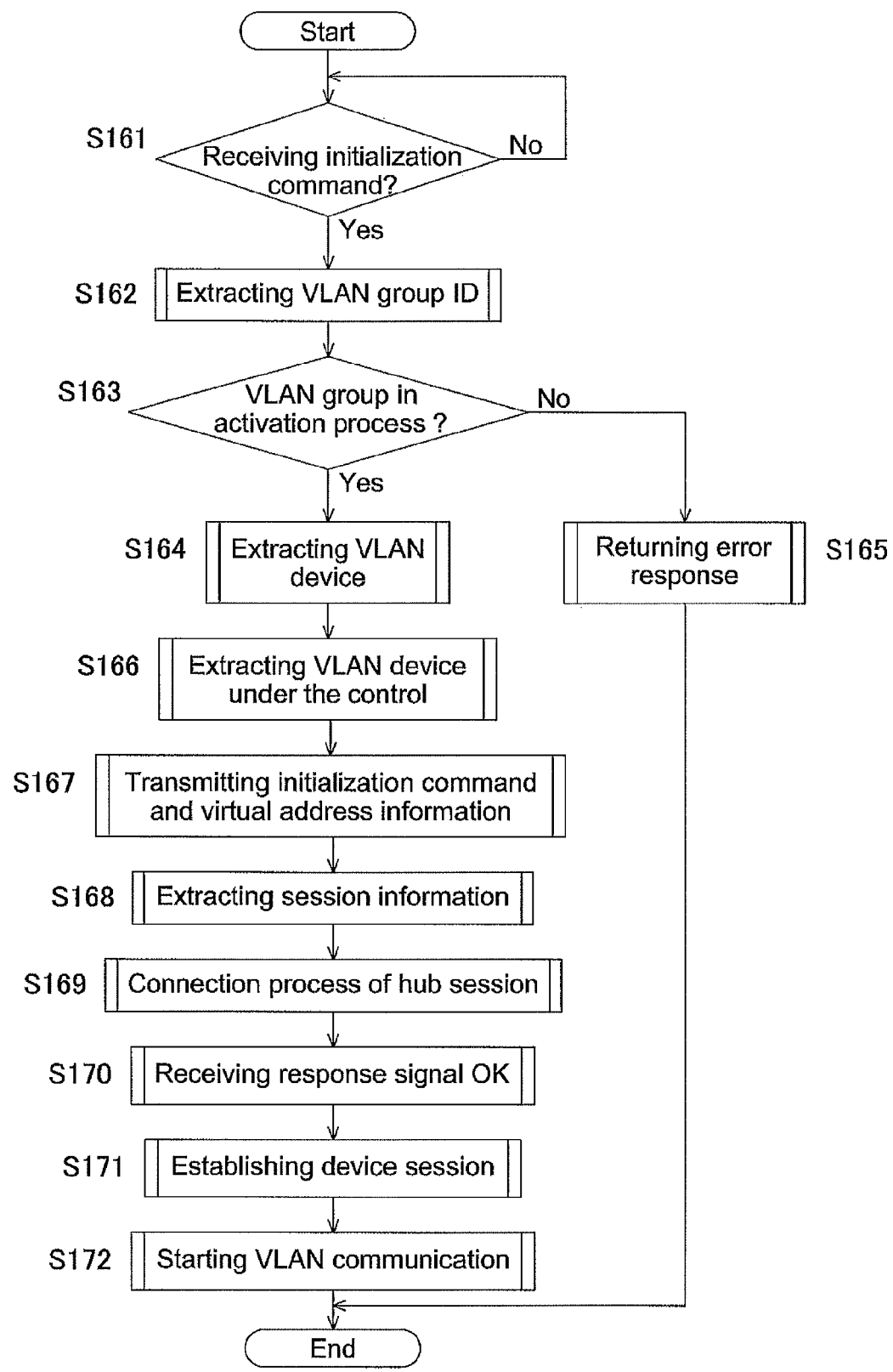
FIG. 24 is a flowchart showing a process of establishing the VLAN session in the relay server which has received the initialization command according to a preferred embodiment of the present invention.

First, referring to FIG. 24, a process when the second relay server B receives the virtual address information 80, which has been transmitted after the first client terminal A1 creates the virtual address information 80, and the initialization command (step S119 in FIG. 20A) will be described. FIG. 24 is a flowchart showing a process of establishing the VLAN session in a relay server that has received the initialization command according to a preferred embodiment of the present invention. The operation by the third relay server C after it receives from the first client terminal A1, the virtual address information 80 and the initialization command is preferably similar to that of the second relay server B, which will be described below, so their explanation will be omitted.

The VLAN session control unit 135 of the second relay server B, when receiving the virtual address information 80 and the initialization command from the first client terminal A1 (Yes at step S161), extracts identification information of the VLAN group from the initialization command (step S162). In this example, the VLAN session control unit 135 extracts "1279672104671. clientA1.rd.002@trial.net".

Next, the VLAN session control unit 135 determines whether or not the first VLAN group identified by the extracted identification information is in an activation process (step S163). If the first VLAN group is not in the activation process, an error reply is returned to the first client terminal A1 (step S165), and the process is finished.

On the other hand, if the first VLAN group is in the activation process, the VLAN session control unit 135 extracts the VLAN device from virtual address information 80 (step S164). In this example, the VLAN session control unit 135 extracts the first client terminal A1, the third client terminal B1, the fourth client terminal B2, and the fifth client terminal C1, as VLAN devices. Next, the VLAN session control unit 135 refers to the VLAN group information 70 stored in the VLAN group information storage unit 144, and further extracts the VLAN devices under the control of the already extracted VLAN devices, i.e., the VLAN device connected to the second relay server B (step S166). In this example, the third client terminal B1 and the fourth client terminal B2 are preferably extracted. After that, the VLAN session control unit 135 forwards the received initialization command and the virtual address information 80 to the VLAN devices under the control thereof (step S167).

Next, the VLAN session control unit 135 extracts the session information 73 from the VLAN group information 70 (step S168). After extracting the session information 73, the VLAN session control unit 135 refers to the session information 73, and establishes a hub session in which the second relay server B is set as "sp" and that has not been established yet (step S169). In this example, the VLAN session control unit 135 preferably establishes a hub session with the third relay server C, which is set as "ep". At this time, in the first relay server A too, a process is performed to establish a hub session in which the second relay server is set as "sp" and that has not been established yet.

After receiving a response signal meaning OK to the establishment of the hub session from the third relay server C (step S170), the VLAN session control unit 135 refers to the VLAN group information 70, and establishes a device session with the VLAN devices connected to the second relay server B (step S171). In this example, the VLAN session control unit 135 preferably refers to the VLAN client terminal information 72 of the VLAN group information 70, and establishes a device session with the third client terminal B1 as a VLAN device.

After that, after receiving the response signal meaning OK from the third client terminal B1 and the fourth client terminal B2, the client terminals can communicate with each other as VLAN devices using the virtual address and the VLAN session (step S172).

Figure 25:
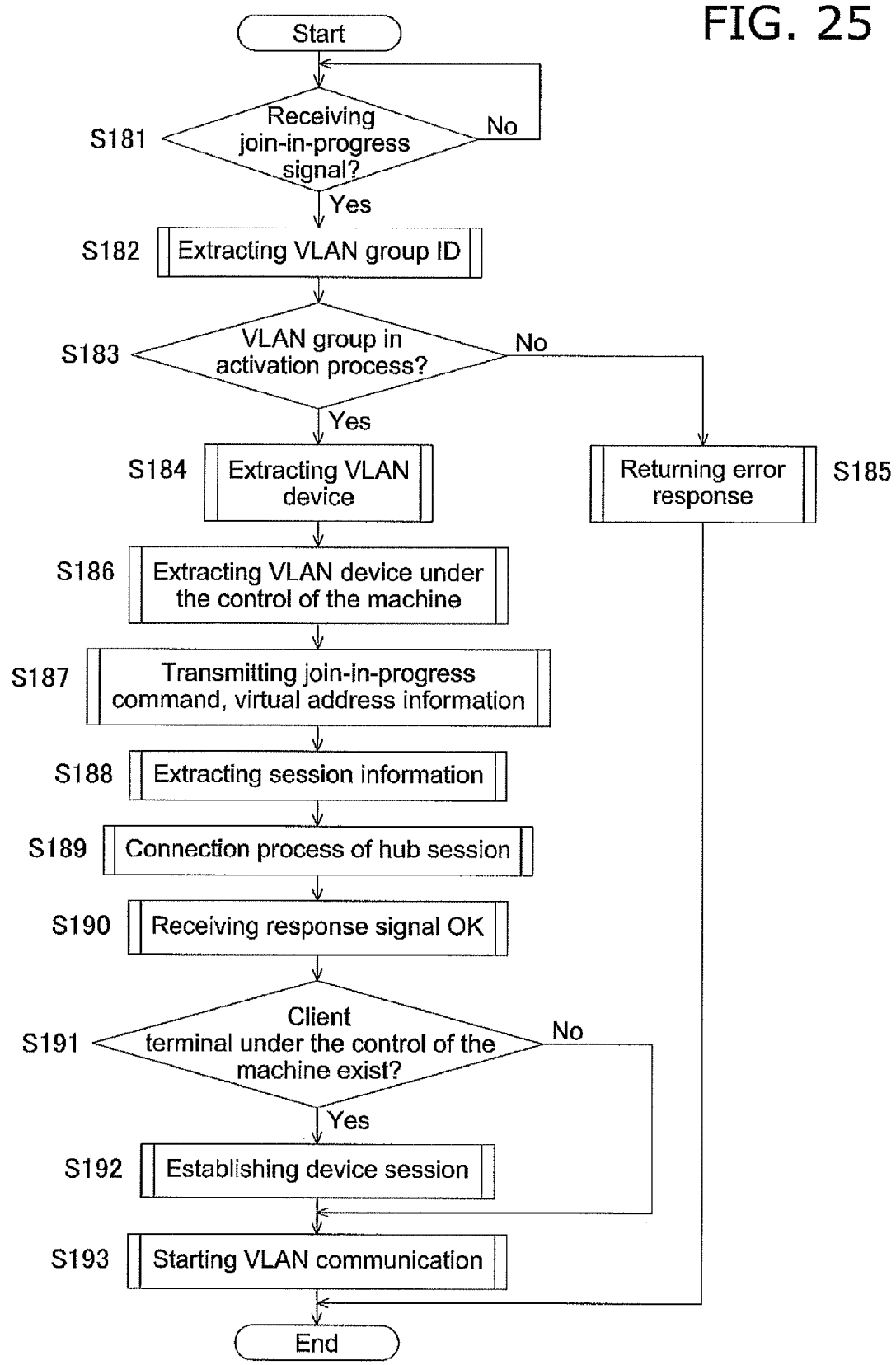
FIG. 25 is a flowchart showing a process of establishing the VLAN session in the relay server which has received the join-in-progress command according to a preferred embodiment of the present invention.

Next, a process performed by the second relay server B when the second relay server receives the updated virtual address information and join-in-progress command (refer to step S131 in FIG. 20B) from the first client terminal A1 will be described with reference to FIG. 25. FIG. 25 is a flowchart showing a process of establishing the VLAN session in the relay server which has received the join-in-progress command in accordance with a preferred embodiment of the present invention.

If the VLAN session control unit 135 of the second relay server B receives the virtual address information and the join-in-progress command from the first client terminal A1 (Yes at step S181), the VLAN session control unit 135 extracts the identification information of the VLAN group from the join-in-progress command (step S182).

Next, the VLAN session control unit 135 determines whether or not the first VLAN group identified by the extracted identification information is in an activation process (step S183). If the first VLAN group is not in the activation process, the VLAN session control unit 135 returns an error reply to the first client terminal A1 (step S185), and the process is finished.

On the other hand, if the first VLAN group is in the activation process, the VLAN session control unit 135 extracts the VLAN device from the updated virtual address information (step S184). Next, the VLAN session control unit 135 refers to the VLAN group information 70 stored in the VLAN group information storage unit 144, and extracts, from the VLAN devices, the VLAN devices under the control of the second relay server B, i.e., the VLAN devices connected to the second relay server B (step S186). After that, the VLAN session control unit 135 transmits the join-in-progress command and the updated virtual address information to the VLAN devices under the control of the second relay server B, i.e., the VLAN devices connected to the second relay server B (step S187).

Next, the VLAN session control unit 135 extracts the session information 73 from the VLAN group information 70 (step S188). After extracting the session information 73, the VLAN session control unit 135 refers to the session information 73, and establishes a hub session in which the second relay server B is set as "sp" and which has not been established yet (step S189). In other words, the VLAN session control unit 135 preferably uses the hub session which has been already established by the previous activation of the first VLAN group, and newly establishes a hub session that has needed to be established by joining of the VLAN client terminal which has been allowed the join-in-progress. At this time, among other relay servers serving as a hub, a process is performed to establish the hub session.

After receiving an OK response signal from a relay server to which the hub session is connected (step S190), the VLAN session control unit 135 refers to the VLAN group information 70, and determines whether or not there is a VLAN device under the control of the second relay server B, i.e., the VLAN device connected to the second relay server B exist (step S191). If there is a VLAN device under the control of the second relay server B (Yes at step S191), the VLAN session control unit 135 establishes a device session with the VLAN device under the control of the second relay server B (step S192).

If the device session is established with the VLAN devices under the control of the second relay server B, or if there is no VLAN device under the control of the second relay server B (No at step S191), then the client terminals can communicate with each other as VLAN devices using the virtual address and the VLAN session (step S193).

Figure 26:
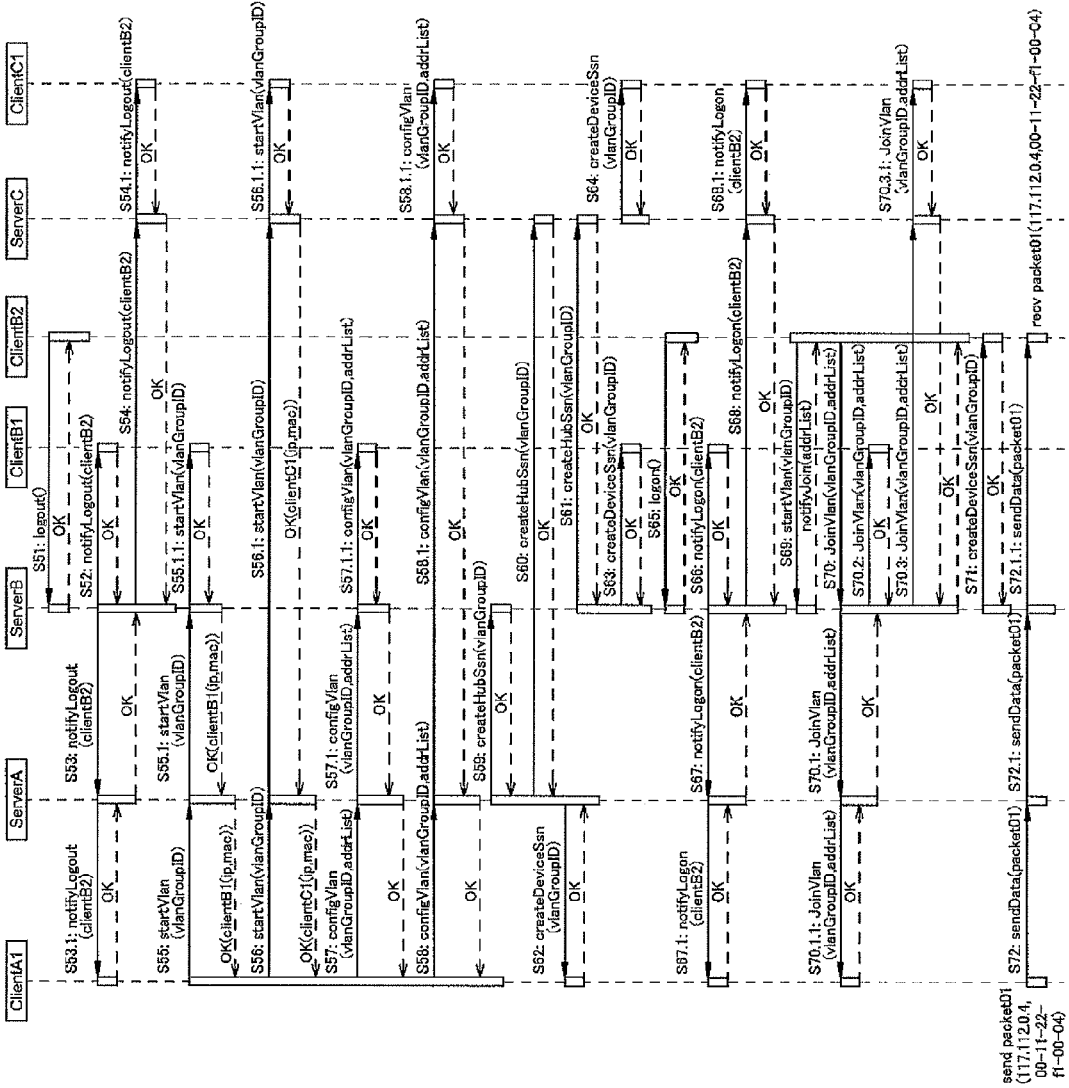
FIG. 26 is a view showing an example of flow process related to the establishment of the VLAN session according to a preferred embodiment of the present invention.

With reference to the sequence diagram of FIG. 26, a flow of data when the VLAN session is established will be described. FIG. 26 is a view showing an example of a flow of process related to establishment of the VLAN session in accordance with a preferred embodiment of the present invention.

Below, a process for establishing a VLAN session in the first VLAN group will be described with a following example. In this example, in a state wherein the VLAN group information 70 is preferably shared among the first client terminal A1, the third client terminal B1, the fourth client terminal B2, and the fifth client terminal C1 (refer to FIG. 19), the fourth client terminal B2 logs out from the first relay group. After that, after the VLAN session is established in the first VLAN group, the fourth client terminal B2 logs on again, and the fourth client terminal B2 receives an activation instruction of the first VLAN group from a user.

During this time, the relay servers in the first relay group communicate, using the ordinary IP address and MAC address, with the activated other relay servers in the first relay group via the WAN interface. And, among the relay servers, change in the connection state in the first relay group is shared. The activated client terminals in the first relay group communicate with the relay servers to which the client terminals are connected via the LAN interface. And, between the client terminal and the relay server, the change in the connection state in the relay communication system is shared.

First, the fourth client terminal B2 logs out from the first relay group. Specifically, the fourth client terminal B2 notifies the second relay server B of the logging-out (step S51: logout( )), and receives OK from the second relay server B. The second relay server B, to which the logging-out has been notified, refers to the relay server information, and notifies the third client terminal B1 of the logging-out of the fourth client terminal B2 (step S52: notifyLogout(clientB2)). The third client terminal B1 returns OK to the second relay server B. The second relay server B refers to the relay server information, and notifies the first relay server A of the logging-out of the fourth client terminal B2 (step S53: notifyLogout(clientB2)). The first relay server A refers to the relay server information, and notifies the first client terminal A1 of the logging-out of the fourth client terminal B2 (step S53.1: notifyLogout(clientB2)). If OK is returned from the first client terminal A1, the first relay server A returns OK to the second relay server B. In this example, although not shown in the figures, the first relay server A preferably refers to the relay server information, and notifies the second client terminal A2, which constitutes the first relay group, of the logging-out of the fourth client terminal B2.

Furthermore, the second relay server B refers to the relay server information, and notifies the third relay server C of the logging-out of the fourth client terminal B2 (step S54: notifyLogout(clientB2)). The third relay server C refers to the relay server information, and notifies the fifth client terminal C1 of the logging-out of the fourth client terminal B2 (step S54.1: notifyLogout(clientB2)). If OK is returned from the fifth client terminal C1, the third relay server C returns OK to the second relay server B. According to the above-described process, all of the relay servers and the client terminals in the first relay group share the logging-out of the fourth client terminal B2.

After that, if the first client terminal A1 receives the activation instruction of the first VLAN group from the user, the activation process of the first VLAN group is started. First, the first client terminal A1 transmits the activation information including the activation command, the activation time, and the VLAN group information 70, to the second relay server B, which servers as hub in the VLAN group and is in an active state, via the first relay server A (step S55: StartVlan(vlanGroupID), step S55.1: StartVlan(vlanGroupID)). The second relay server B refers to the VLAN group information 70, and extracts the third client terminal B1 and the fourth client terminal B2, which are VLAN client terminals connected to the second relay server B. Then, the second relay server B determines whether or not the third client terminal B1 and the fourth client terminal B2 are VLAN devices, and then transmits the activation information to the VLAN devices. In this example, since the fourth client terminal B2 has logged out, the second relay server B transmits the activation command, the activation time, and the VLAN group information 70 to the third client terminal B1, which is a VLAN device (step S55.1.1: StartVlan(vlanGroupID)).

If OK is returned from the third client terminal B1, the second relay server B transmits a response signal (OK (clientB1(ip,mac))) via the first relay server A to the first client terminal A1. The response signal includes the identification information, the IP address, and the MAC address of the third client terminal B1.

Furthermore, the first client terminal A1 transmits the activation command, the activation time, and the VLAN group information 70 to the third relay server C, which serves as a hub in the VLAN group and is in an active state, via the first relay server A (step S56: StartVlan(vlanGroupID), step S56.1: StartVlan(vlanGroupID)). The third relay server C refers to the VLAN group information 70, and extracts the fifth client terminal C1, which is a VLAN client terminal connected to the third relay server C. Then, the third relay server C determines whether or not the fifth client terminal C1 is a VLAN device, and then transmits the activation command, the activation time, and the VLAN group information 70 to the fifth client terminal C1 (step S56.1.1: StartVlan(vlanGroupID)).

If OK is returned from the fifth client terminal C1, the third relay server C transmits the response signal (OK (clientC1(ip,mac))) via the first relay server A to the first client terminal A1. The response signal includes the identification information, the IP address, and the MAC address of the fifth client terminal C1.

Next, the first client terminal A1 performs a process of extracting from the response signal and creating the virtual address information (refer to step S116, S118 in FIG. 20A), and transmits the initialization command and the created virtual address information 80 to the relay servers to which the VLAN device and the VLAN device are connected. The virtual address information 80 preferably includes, as shown in FIG. 12, the identification information, the virtual IP address, and the virtual MAC address of the first client terminal A1, the third client terminal B1, and the fifth client terminal C1.

First, the first client terminal A1 transmits the initialization command and the virtual address information 80, via the first relay server, to the second relay server B (step S57: configVlan(vlanGroupID, addrList), step S57.1: configVlan(vlanGroupID, addrList)). Next, the second relay server B transmits the initialization command and the virtual address information 80 to the third client terminal B1 (step S57.1.1: configVlan(vlanGroupID, addrList)), which has been extracted through the extraction process (refer to step S161 through step S164 and step S166 in FIG. 24). If OK is received from the third client terminal B1, the second relay server B returns OK to the first relay server A. The first relay server A, which has received OK, returns OK to the first client terminal A1.

The first client terminal A1 transmits the initialization command and the virtual address information 80 to the third relay server C via the first relay server A (step S58: configVlan (vlanGroupID, addrList), step S58.1: configVlan(vlanGroupID, addrList)). Next, the third relay server C forwards the initialization command and the virtual address information to the fifth client terminal C1 (step S58.1.1: configVlan (vlanGroupID, addrList)), which has been extracted through the above-described process (refer to step S161 through step S164 and step S166 in FIG. 24). If OK is received from the fifth client terminal C1, the third relay server C returns OK to the first relay server A. The first relay server A, which has received OK, returns OK to the first client terminal A1. According to the above-described process, the virtual address information is preferably transmitted to all of the VLAN devices in the first VLAN group.

After that, the relay sever to which the VLAN device is connected refers to the session information 73 of the VLAN group information 70, and establishes a hub session in which the relay server is set as "sp" and which has not been established yet. In this example, any of the hub sessions have not been established yet and therefore the first relay server A, which is designated as "sp", preferably requests the second relay server B, which is designated as "ep", to establish a hub session (step S59: createHubSsn(vlanGroupID)). If OK is returned from the second relay server B, a hub session is established between the first relay server A and the second relay server B. Furthermore, the first relay server A, which is designated as "sp", requests the third relay server C, which is designated as "ep", to establish a hub session (step S60: createHubSsn(vlanGroupID)). If OK is returned from the third relay server C, a hub session is established between the first relay server A and the third relay server C.

Furthermore, the second relay server B, which is designated as "sp", requests the third relay server C, which is designated as "ep", to establish a hub session (step S61: createHubSsn (vlanGroupID)). If OK is returned from the third relay server C, a hub session is established between the second relay server B and the third relay server C.

If the hub session is established, a relay server to which the VLAN device is connected establishes a device session with a VLAN device connected to the relay server. First, the first relay server A requests the first client terminal A1 to establish a device session (step S62: createDeviceSsn(vlanGroupID)). If OK is returned from the first client terminal A1, a device session is established between the first relay server A and the first client terminal A1.

The second relay server B requests the third client terminal B1 to establish a device session (step S63: createDeviceSsn (vlanGroupID)). If OK is returned from the third client terminal B1, a device session is established between the second relay server B and the third client terminal B1. Furthermore, the third relay server C requests the fifth client terminal C1 to establish a device session (step S64: createDeviceSsn(vlanGroupID)). If OK is returned from the fifth client terminal C1, a device session is established between the third relay server C and the fifth client terminal C1.

As described above, if a VLAN session is established including a hub session and a device session in the VLAN group, the VLAN devices preferably initializes the VLAN interfaces of the LAN devices, and set the virtual addresses in the VLAN interfaces. If the virtual address is set in the VLAN devices, the client terminals can communicate with each other as VLAN devices using the virtual address and the VLAN session.

In this state, the fourth client terminal B2 logs on again. Specifically, the fourth client terminal B2 notifies the second relay server B of the logging-on (step S65: login( )), and receives OK from the second relay server B. The second relay server B, being notified of the logging-on, refers to the relay server information, and notifies the third client terminal B1 of the logging-on of the fourth client terminal B2 (step S66: notifyLogon(clientB2)). The third client terminal B1 returns OK to the second relay server B. The second relay server B refers to the relay server information, and notifies the first relay server A of the logging-on of the fourth client terminal B2 (step S67: notifyLogon(clientB2)). The first relay server A refers to the relay server information, and notifies the first client terminal A1 of the logging on of the fourth client terminal B2 (step S67.1: notifyLogon(clientB2)). If OK is returned from the first client terminal A1, the first relay server A returns OK to the second relay server B. In this example, although not shown in the figures, the first relay server A refers to the relay server information, and notifies the second client terminal A2, constituting the first relay group, of the logging-on of the fourth client terminal B2.

Furthermore, the second relay server B refers to the relay server information, and notifies the third relay server C of the logging-on of the fourth client terminal B2 (step S68: notify-Logon(clientB2)). The third relay server C refers to the relay server information, and notifies the fifth client terminal C1 of the logging-on of the fourth client terminal B2 (step S68.1: notifyLogon(clientB2)). If OK is returned from the fifth client terminal C1, the third relay server C returns OK to the second relay server B. According to the above-described process, all of the relay servers and the client terminals in the first relay group share the logging-on of the fourth client terminal B2.

After that, if the fourth client terminal B2 receives the activation instruction of the first VLAN group from a user, the fourth client terminal B2 transmits, to the second relay server B, the activation command, the activation time, and the VLAN group information 70 (step S69: StartVlan(Vlan-GroupID)).

At this time, the second relay server B preferably refers to the received activation command, the activation time, and the VLAN group information 70, and determines whether or not the received activation time is valid. In addition, the second relay server B preferably determines whether or not the initialization command and the virtual address information have been received, and then transmits the join-in-progress signal (notifyJoin(addr List)) to the fourth client terminal B2 (refer to step S143 through S146, S148 through S149 in FIG. 23A). In this example, since the activation time received from the fourth client terminal B2 is later than the activation time received from the first client terminal A1 at step S55, S55.1, the second relay server B determines that the activation time received from the fourth client terminal B2 is invalid. Furthermore, since the second relay server B has already received the initialization command and the virtual address information 80 at step S57, S57.1, the second relay server B transmits, to the fourth client terminal B2, the initialization command, the virtual address information 80, and the join-in-progress signal.

If the fourth client terminal B1 receives the join-in-progress signal, the fourth client terminal B2 refers to the assigned virtual address extracted from the virtual address information 80, determines the virtual address for the fourth client terminal B2, and updates the virtual address information. Then, the fourth client terminal B2 transmits the updated virtual address information (refer to step S123 through 131 in FIG. 20B). In this example, the fourth client terminal B2 determines that it can determine the virtual address for the fourth client terminal B2, and assigns virtual IP address and virtual MAC address (177.112.0.4,00-11-22-f0-00-04) to the fourth client terminal B2, which are defined by changing the ends of the extracted assigned virtual IP address and virtual MAC address.

After that, the updated virtual address information and join-in-progress command are preferably transmitted to the VLAN devices based on the updated virtual address information and the VLAN group information 70. First, the fourth client terminal B2 transmits the updated virtual address information and join-in-progress command to the second relay server B (step S70: JoinVlan(vlanGroupID, addr List)). The second relay server B transmits the updated virtual address information and the join-in-progress command to the first relay server A (step S70.1: JoinVlan(vlanGroupID, addr List)). The first relay server A transmits the updated virtual address information and the join-in-progress command to the first client terminal A1 (step S70.1.1: JoinVlan(vlanGroupID, addr List)). If OK is returned from the first client terminal A1, the first relay server A returns OK to the second relay server B.

The second relay server B transmits the updated virtual address information and join-in-progress command to the third client terminal B1 (step S70.2: JoinVlan(vlanGroupID, addr List)). The third client terminal B1 returns OK to the second relay server B.

Furthermore, the second relay server B transmits the updated virtual address information and join-in-progress command to the third relay server C (step S70.3: JoinVlan (vlanGroupID, addr List)). The third relay server C transmits the updated virtual address information and join-in-progress command to the fifth client terminal C1 (step S70.3.1: Join-Vlan(vlanGroupID, addr List)). If OK is returned from the fifth client terminal C1, the third relay server C returns OK to the second relay server B. If the second relay server B receives OK from the first client terminal A1, the third client terminal B1, and the fifth client terminal C1, the second relay server B returns OK to the fourth client terminal B2.

According to the above-described process, the updated virtual address information is transmitted to the VLAN devices.

After that, a relay sever serving as a hub refers to the session information 73 of the VLAN group information 70, and establishes a hub session in which the relay server is preferably set as "sp" and which has not been established yet. In this example, all of the hub sessions have been established. In addition, if there is a device session that has not been established with a VLAN device connected to the relay server, the relay server serving as a hub establishes a device session. In this example, the second relay server B establishes a device session with the fourth client terminal B2 (step S71: createDeviceSsn(vlanGroupID)).

As described above, after the VLAN session including the hub session and the device session is established in the VLAN group, the VLAN devices initialize the VLAN interfaces of the VLAN devices, and set the virtual addresses in the VLAN interfaces. After the virtual address is set in the VLAN devices, the VLAN device can communicate with each other as VLAN devices using the virtual address and the VLAN session.

For example, the first client terminal A1, which has virtual IP address of "117.112.0.1" and virtual MAC address of "00.11.22:f0:00:01", can forward data, via the VLAN session, to the fourth client terminal B2, which has virtual IP address of "117.112.0.4" and virtual MAC address of "00.11.22:f0:00:04". Specifically, the first client terminal A1 transmits the communication packet to the first relay server A) via the device session (step S72: sendData (packet01)). The communication packet includes virtual address of the third client terminal B1 as a transmit target, and data to be transmitted. Next, the first relay server A transmits the communication packet to the second relay server B via the hub session (step S72.1: sendData (packet01)). After that, the second relay server B transmits the communication packet to the fourth client terminal B2 via the device session (step S72.1.1: sendData (packet01)).

In the relay system of this preferred embodiment, as described above, the VLAN group information is shared in the VLAN group. Furthermore, if the VLAN group is activated, a VLAN session is established among the VLAN devices, and a process is performed of sharing among the VLAN devices the virtual address information that has been created when activating the VLAN group. Furthermore, a process is performed of setting virtual address in the VLAN interface of the VLAN devices, the data is sent and received among the VLA devices via the VLAN interfaces and the VLAN sessions. As described above, in the relay communication system of this preferred embodiment, the client terminals can preferably communicate with each other as VLAN devices, using the virtual address and the VLAN session.

Furthermore, in the relay system of this preferred embodiment, the overlapping of the activation of the VLAN group is preferably prevented. If the activation instructions of the VLAN group are overlapped, the VLAN client terminal which has later instructed the same VLAN group to be activated is arranged to join in-progress with the VLAN group unless the address the VLAN client terminal actually uses and the virtual address belong to the same address system.

Although specific preferred embodiments according to the present invention were explained above, the present invention is not limited to the above-described preferred embodiments. The preferred embodiments can be altered in various ways without departing from the scope of the present invention. Particularly, a plurality of preferred embodiments and variations and features thereof can be arbitrarily combined with each other as necessary.

For example, a client terminal registered in the relay server information can log in remotely via other relay servers other than a relay server to which the client terminal is connected, if the relay server constitutes the same relay group. Accordingly, the VLAN client terminal can log in via different relay servers between when creating the VLAN group information and when activating the VLAN group. The state of the client terminal logging in via the other relay server is shared among the relay servers and the client terminals activated in the same relay group by sharing the same relay server information.

In the above-described case, the VLAN group information update unit 235 of the client terminal updates, receiving the selection of the VLAN group to be activated, the session information to session information including a relay server which has received the remote log-in. Then, the VLAN group information update unit 235 allows the VLAN client terminals and relay severs to which the VLAN client terminal is connected to share the updated VLAN group information.

For example, it is assumed that the first relay group includes the fourth relay server to which the VLAN client terminal is not connected, in addition to the first relay server A, the second relay server B, and the third relay server C. In this first relay group, if the first client terminal A1 remotely logs into the first relay group via the fourth relay server instead of the first relay server A, the shared session information does not include the identification information of the fourth relay server.

Therefore, when receiving the activation instruction of the VLAN group in the above-described state, the VLAN group information update unit 235 adds the identification information of the fourth relay server to the hub information of the session information. In addition, the VLAN group information update unit 235 creates routing information between the fourth relay server and another relay server to which the VLAN device is connected, and updates the session information of the VLAN group information. Then, the VLAN group information update unit 235 transmits the updated VLAN group information to the VLAN devices and the relay servers to which the VLAN devices are connected.

Preferred embodiments of the present invention can be applied to a relay server communication system including a plurality of relay servers that can communicate with each other, a plurality of client terminals, LANs connecting the client terminals to the relay servers, and to a relay server used in the relay server communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A relay communication system comprising:
a first network;
a second network;
a first hardware relay server connected to the first network;
a second hardware relay server connected to the second network, and configured to communicate with the first relay server via a third network;
one or more client terminals connected to the first relay server via the first network;
one or more client terminals connected to the second relay server via the second network; wherein
each of the first relay server, the second relay server, the one or more client terminals connected to the first relay server, and the one or more client terminals connected to the second relay server includes:
  a relay group information storage unit configured to store relay group information that indicates the first relay server, the second relay server, the one or more client terminals connected to the first relay server, and the one or more client terminals connected to the second relay server define a relay group;
  a relay server information storage unit configured to store relay server information including activation information of the first relay server, activation information of the second relay server, activation/registration information of the one or more client terminals connected to the first relay server, and activation/registration information of the one or more client terminals connected to the second relay server;
  an information sharing unit configured to allow the first relay server, the second relay server, the one or more client terminals connected to the first relay server, and the one or more client terminals connected to the second relay server, to share the relay group information and the relay server information;
  a VLAN group information control unit programmed and configured to allow VLAN client terminals defining the VLAN group in the relay group to share VLAN group information, at least two client terminals among the one or more client terminals connected to the first relay server and the one or more client terminals connected to the second relay server being the VLAN client terminals, and the VLAN group information including hub information including identification information of the first relay server and identification information of the second relay server to which the VLAN client terminal is connected, session information that indicates a connecting-side and a connected-side of a session established between the first relay server and the second relay server, and identification information that identifies the VLAN client terminal, each of the first relay server and the second relay server further includes:
  a VLAN session control unit programmed and configured to, if the VLAN group is not activated in a case of receiving an activation instruction of the VLAN group, establish a hub session as a VLAN session between the first relay server and the second relay server based on the session information, and establish a device session as a VLAN session between a VLAN device as an activatable VLAN client terminal and the first relay server or the second relay server to which the VLAN device is connected; and
  an activation command control unit programmed and configured to, if the VLAN group is activated in a case of receiving an activation instruction of the VLAN group, transmit a join-in-progress signal which allows a join-in-progress to a VLAN group to a join-in-progress VLAN client terminal as a transmission source of the activation instruction;
  each of the one or more client terminals connected to the first relay server and the one or more client terminals connected to the second relay server further includes a virtual address control unit programmed and configured to, if the client terminal is the join-in-progress VLAN client terminal and receives the join-in-progress signal, update the virtual address information by adding virtual address of a client terminal created based on the virtual address information including virtual address assigned to the VLAN device constituting the VLAN group in an active state, and transmit the updated virtual address information to the VLAN device,
  the VLAN session control unit is programmed and configured to establish a VLAN session that is related to the join-in-progress VLAN client terminal and has not been established yet, and
  the join-in-progress VLAN client terminal and the VLAN device are configured to communicate with each other, using the updated virtual address information and the established VLAN session including the hub session and the device session.

2. The relay communication system according to claim 1, wherein the activation command control unit is programmed and configured to determine whether or not the virtual address is assigned to the VLAN device of the VLAN group in an active state, and transmit the join-in-progress signal to the join-in-progress VLAN client terminal if the virtual address is assigned.

3. The relay communication system according to claim 1, wherein the virtual address control unit is programmed and configured to determine whether or not a virtual address for a client terminal can be created referring to the virtual address information, and finish a process of join-in progress to the VLAN group if it is determined that the virtual address can not be created.

4. The relay communication system according to claim 1, wherein the virtual address includes a virtual IP address and a virtual MAC address.

5. A hardware relay server configured to serve as a second hardware relay server connected to a second network, and communicate with a first hardware relay server connected to a first network, the hardware relay server comprising:
  a relay group information storage unit configured to store relay group information that indicates that the first relay server, the second relay server, one or more client terminals connected to the first relay server, and one or more client terminals connected to the second relay server define a relay group;
  a relay server information storage unit configured to store relay server information including activation information of the first relay server, activation information of the second relay server, activation/registration information of the one or more client terminals connected to the first relay server, and activation/registration information of the one or more client terminals connected to the second relay server;
  an information sharing unit configured to allow the first relay server, the second relay server, the one or more client terminals connected to the first relay server, and the one or more client terminals connected to the second relay server, to share the relay group information and the relay server information;

a VLAN group information control unit programmed and configured to allow VLAN client terminals defining the VLAN group in the relay group to share VLAN group information, at least two client terminals among the one or more client terminals connected to the first relay server and the one or more client terminals connected to the second relay server being the VLAN client terminals, and the VLAN group information including hub information including identification information of the first relay server and identification of the second relay server to which the VLAN client terminal is connected, session information that indicates a connecting-side and a connected-side of a session established between the first relay server and the second relay server, and identification information that identifies the VLAN client terminal;

a VLAN session control unit programmed and configured to, if the VLAN group is not in an active state in a case of receiving activation instruction of the VLAN group, establish a hub session as a VLAN session with the first relay server based on the session information, and establish a device session as a VLAN session with a VLAN device as an activatable VLAN client terminal among the VLAN client terminals connected to the second relay server;

an activation command control unit programmed and configured to transmit join-in progress signal permitting join-in-progress to the VLAN group to a join-in-progress VLAN client terminal as a transmission source of the activation instruction if the VLAN group is in an active state in a case of receiving an activation instruction related to the VLAN group; and a relay server communication control unit programmed and configured to control communication of the VLAN group; wherein the VLAN session control unit is programmed and configured to, in response to the join-in-progress signal, if receiving the virtual address information updated by adding a virtual address of the join-in-progress VLAN client terminal to a virtual address assigned to the VLAN device constituting the activated VLAN group, establish a VLAN session that is related to the join-in-progress VLAN client terminal and has not been established yet, the relay server communication control unit is programmed and configured to control communication between the join-in-progress VLAN client terminal and the VLAN device, the communication being performed using the updated virtual address information and the established VLAN session including the hub session and the device session.

6. The relay server according to claim 5, wherein the activation command control unit is programmed and configured to determine whether or not virtual address has been assigned to the VLAN device of the activated VLAN group, and transmit the join-in-progress signal to the join-in-progress VLAN client terminal if the virtual address is assigned.

7. The relay server according to claim 5, wherein the virtual address includes a virtual IP address and a virtual MAC address.

* * * * *